United States Patent
Raeppel et al.

(10) Patent No.: US 12,466,838 B2
(45) Date of Patent: Nov. 11, 2025

(54) CRYSTALLINE FORM OF A MULTI-TYROSINE KINASE INHIBITOR, METHOD OF PREPARATION, AND USE THEREOF

(71) Applicant: Mirati Therapeutics, Inc., San Diego, CA (US)

(72) Inventors: Franck Raeppel, Montreal (CA); Stephane L. Raeppel, Boucherville (CA)

(73) Assignee: MIRATI THERAPEUTICS, INC., Princeton, NJ (US)

( * ) Notice: Subject to any disclaimer, the term of this patent is extended or adjusted under 35 U.S.C. 154(b) by 863 days.

(21) Appl. No.: 17/762,713

(22) PCT Filed: Sep. 9, 2020

(86) PCT No.: PCT/US2020/049986
§ 371 (c)(1),
(2) Date: Mar. 22, 2022

(87) PCT Pub. No.: WO2021/050580
PCT Pub. Date: Mar. 18, 2021

(65) Prior Publication Data
US 2022/0402936 A1  Dec. 22, 2022

Related U.S. Application Data

(60) Provisional application No. 62/898,469, filed on Sep. 10, 2019.

(51) Int. Cl.
*C07D 495/04* (2006.01)
*A61P 35/00* (2006.01)

(52) U.S. Cl.
CPC ........... *C07D 495/04* (2013.01); *A61P 35/00* (2018.01); *C07B 2200/13* (2013.01)

(58) Field of Classification Search
None
See application file for complete search history.

(56) References Cited

U.S. PATENT DOCUMENTS

2012/0095234 A1   4/2012   Raeppel et al.

FOREIGN PATENT DOCUMENTS

| WO | 2008068615 A1 | 6/2008 |
| WO | 2009026717 A1 | 3/2009 |
| WO | 2017029362 A1 | 2/2017 |

OTHER PUBLICATIONS

Noriaki Hirayama, Organic Compound Crystallization Handbook, 2008, pp. 17-23, 37-40, 45-51, and 57-65.
International Search Report for corresponding PCT Application No. PCT/US20/49986 mailed Feb. 4, 2021.
PubChe m-CID-1377 96909, Create Date : Apr. 21, 2019 (Apr. 21, 2019 ), p. 2.

*Primary Examiner* — Brian J Davis
(74) *Attorney, Agent, or Firm* — Roy Issac

(57) ABSTRACT

The present invention relates to crystalline forms of N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide (Compound 1), pharmaceutical compositions comprising the crystalline form, processes for preparing the crystalline form and methods of use therefore.

31 Claims, 13 Drawing Sheets

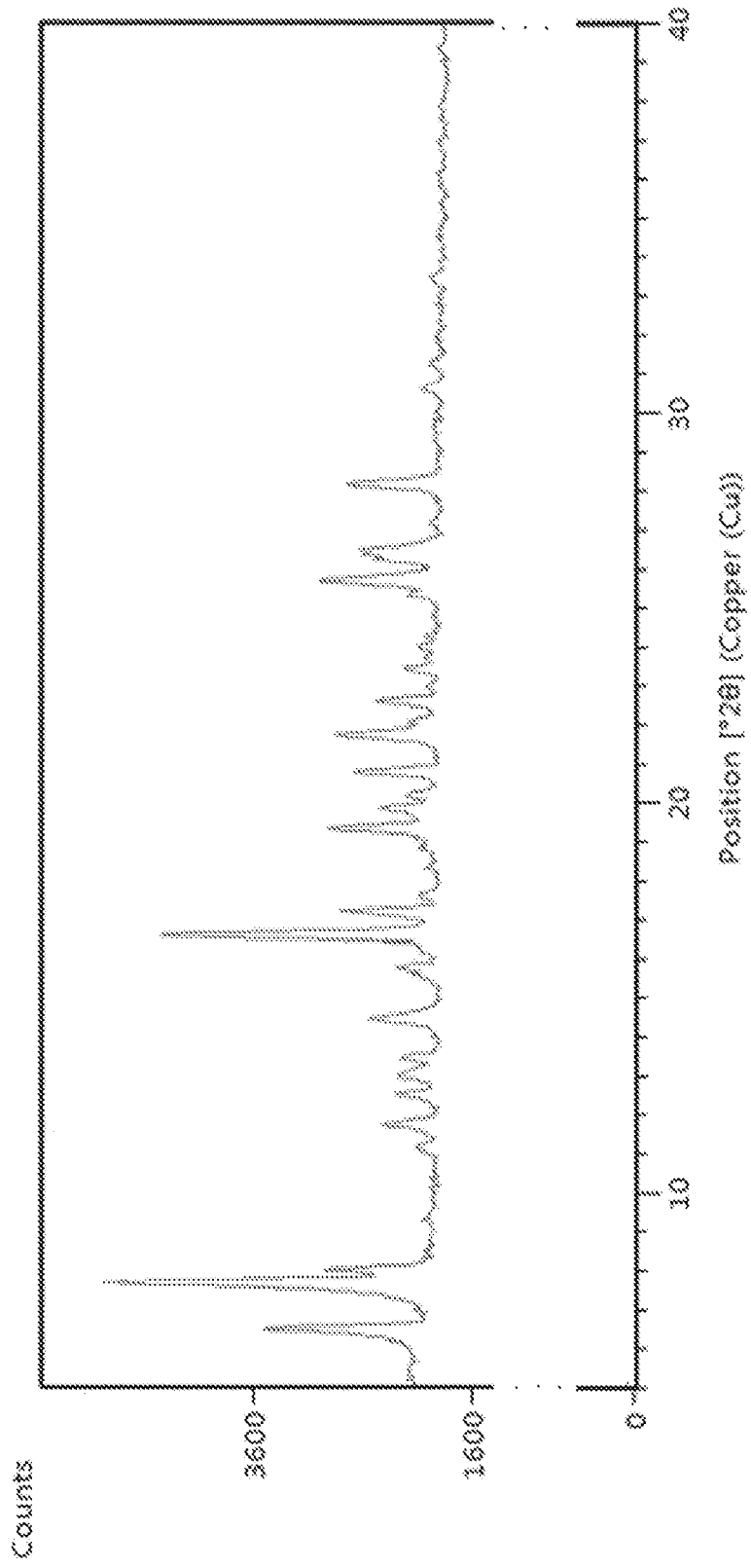

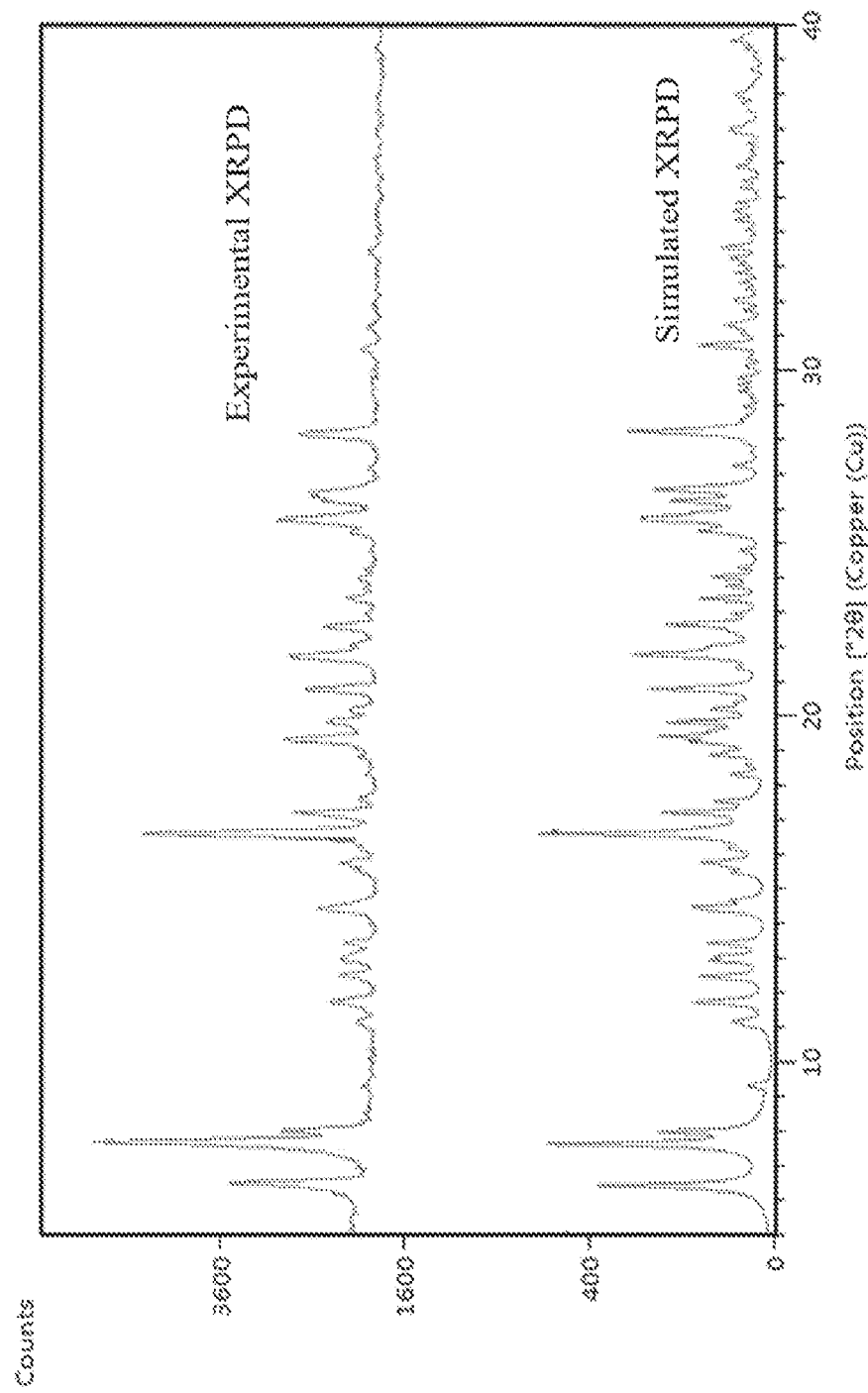
Figure 2A(2)

CRYSTALLINE FORM OF A MULTI-TYROSINE KINASE INHIBITOR, METHOD OF PREPARATION, AND USE THEREOF

CROSS REFERENCE TO RELATED APPLICATIONS

This application is a 35 U.S.C. § 371 national stage application of International Application No. PCT/US2020/049986, filed Sep. 9, 2020, which is entitled to priority pursuant to 35 U.S.C. § 119 (e) to U.S. provisional patent application No. 62/898,469, filed Sep. 10, 2019, which is incorporated herein in its entirety.

FIELD OF THE INVENTION

The present invention relates to crystalline forms of a multi-tyrosine kinase inhibitor. In particular, the present invention relates to a crystalline form of the multi-tyrosine kinase inhibitor N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide, pharmaceutical compositions comprising the crystalline form, processes for preparing the crystalline form, and methods of use thereof.

BACKGROUND OF THE INVENTION

International publication No. WO2009/026717A disclosed compounds with the inhibition activities of multiple protein tyrosine kinases, for example, the inhibition activities of VEGF receptor kinase and HGF receptor kinase. In particular, disclosed N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide (Compound 1) is a multi-tyrosine kinase inhibitor with demonstrated potent inhibition of a closely related spectrum of tyrosine kinases, including RET, CBL, CHR4q12, DDR and Trk, which are key regulators of signaling pathways that lead to cell growth, survival and tumor progression.

Compound 1 shows tumor regression in multiple human xenograft tumor models in mice, and is presently in human clinical trials as a monotherapy as well as in combination for treating a wide range of solid tumors. Compound 1 is presently in Phase 1 clinical trial for patients with advanced cancer, in Phase 2 studies for patients with advanced liposarcoma and non-small cell lung cancer (NSCLC).

The small scale chemical synthesis of the amorphous Compound 1 had been disclosed in the Example 52 (compound 147) of WO2009/026717A, however, in order to prepare the API of Compound 1 with high quality and in large quantity, crystalline forms of Compound 1 would be normally needed so the process impurities could be purged out by recrystallization. Practically, it is difficult to predict with confidence which crystalline form of a particular compound will be stable, reproducible, and suitable for pharmaceutical processing. It is even more difficult to predict whether or not a particular crystalline solid state form will be produced with the desired physical properties for pharmaceutical formulations.

For all the foregoing reasons, there is a great need to produce crystalline forms of Compound 1 that provide manufacturing improvements of the pharmaceutical composition. The present invention advantageously addresses one or more of these needs.

SUMMARY OF THE INVENTION

The present application discloses an invention to address the foregoing challenges and need by providing crystalline forms thereof. The inventors of present invention have unexpectedly found that it was very difficult to obtain a single phase of crystalline form for N-(3-fluoro-4-((2-(5-(((2-methoxyethyl)amino)methyl)pyridin-2-yl)thieno[3,2-b]pyridin-7-yl)oxy)phenyl)-N'-(4-fluorophenyl)cyclopropane-1,1-dicarboxamide (hereinafter referred to as Compound 1). After conducting systematic solid form screening studies with great effort, the inventors of present invention obtained several crystalline materials of Compound 1, Materials A through L, and Forms C, D and H. However, only three crystalline forms (Forms C, D and H) existed with phase uniformity, all other forms were composed of disordered multiple phases. Finally, the inventors of present invention found only Form D has superior physical properties suitable for pharmaceutical formulations and can be manufactured in large commercial scales with high quality and good reproducibility.

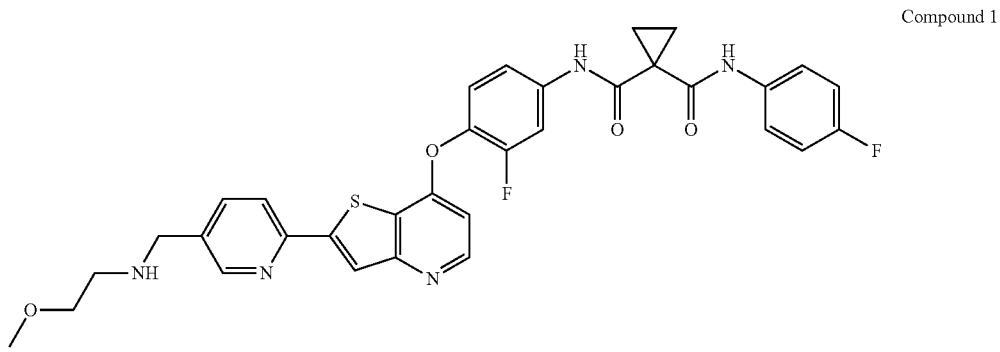 [SMILES: COCCNCc1ccc(-c2cc3nccc(Oc4ccc(NC(=O)C5(C(=O)Nc6ccc(F)cc6)CC5)cc4F)c3s2)nc1]

Compound 1

In first aspect of the invention, provided herein is a crystalline form of Compound 1.

In one embodiment, the crystalline form of Compound 1 is designated as Form C, Form D and Form H.

In one embodiment, the crystalline form of Compound 1 is designated as Form D, which has an X-ray powder diffraction pattern (XRPD) comprising diffraction peaks having °2θ angle values independently selected from the group consisting of 7.8±0.2°, 14.3±0.2° and 17.2±0.2°.

In one embodiment, the Crystalline Form of Compound 1 (Form D) can be a single crystal.

In one embodiment, the crystalline form of Compound 1 is designated as Form C.

In one embodiment, the crystalline form of Compound 1 is designated as Form H.

In another embodiment, the crystalline form of Compound 1 has an XRPD pattern substantially as shown in FIG. 1A, FIG. 2A(1), FIG. 3B, FIG. 3C or FIG. 3D.

In second aspect of the invention, pharmaceutical compositions are provided for use in the methods comprising a therapeutically effective amount of a crystalline form of Compound 1, and pharmaceutically acceptable excipient. In one embodiment, the crystalline form of Compound 1 is selected from Form C, Form D and Form H.

In third aspect of the invention, provided herein are methods for inhibiting multi-tyrosine kinase activity in a cell, comprising contacting the cell in which inhibition of multi-tyrosine kinase activity is desired with a therapeutically effective amount of a crystalline form of Compound 1. In one embodiment, the crystalline form of Compound 1 is selected from Form C, Form D and Form H.

In fourth aspect of the invention, provided herein are methods of treating cancer in a subject in need thereof, comprising administering to the subject a therapeutically effective amount of a crystalline form of Compound 1. In one embodiment, the cancer is a multi-tyrosine kinase-associated cancer. In one embodiment, the multi-tyrosine kinase-associated cancer is lung cancer, including non-small cell lung cancer (NSCLC). In one embodiment, the crystalline form of Compound 1 is selected from Form C, Form D and Form H.

In fifth aspect of the invention, provided herein are processes for the preparation of a crystalline form of Compound 1. In one embodiment, the crystalline form of Compound 1 is selected from Form C, Form D and Form H.

BRIEF DESCRIPTION OF THE FIGURES

FIG. 2A: FIG. 2A(1) illustrates the simulated X-ray powder diffraction (XRPD) pattern of Crystalline Form D of Compound 1 (Compound 1 Form D, a single crystal) prepared according to Example 2B; FIG. 2A(2) illustrates overlaid spectra of simulated (single crystal), experimental XRPD patterns of Crystalline Form D of Compound 1 (Compound 1 Form D) prepared according to Example 2B.

DETAILED DESCRIPTION OF THE INVENTION

The present invention relates to crystalline forms of Compound 1. In particular, the present invention relates to a crystalline form selected from Form C, Form D or Form H of Compound 1, pharmaceutical compositions comprising the crystalline form, processes for preparing the crystalline form and methods of use therefor.

In one embodiment, the crystalline form of Compound 1 is designated as Form C, Form D and Form H.

In one embodiment, the crystalline form of Compound 1 is designated as Form D, which has an X-ray powder diffraction pattern (XRPD) comprising diffraction peaks having °2θ angle values independently selected from the group consisting of 7.8±0.2°, 14.3±0.2° and 17.2±0.2°.

In one embodiment, the crystalline form of Compound 1 is designated as Form D, which has an X-ray powder diffraction pattern (XRPD) comprising diffraction peaks having °2θ angle values independently selected from the group consisting of 7.8±0.2°, 14.3±0.2°, 17.2±0.2° and 21.7±0.2°.

In one embodiment, the crystalline form of Compound 1 is designated as Form D, which has an X-ray powder diffraction pattern (XRPD) comprising diffraction peaks having °2θ angle values independently selected from the group consisting of 7.8±0.2°, 14.3±0.2°, 17.2±0.2°, 21.7±0.2° and 26.4±0.2°.

In another embodiment, Form D has an X-ray powder diffraction pattern comprising diffraction peaks having °2θ angle values independently selected from the group consisting of 7.8±0.2°, 14.3±0.2°, 16.6±0.2°, 17.2±0.2°, 19.3±0.2°, 21.7±0.2° and 26.4±0.2°.

In another embodiment, Form D has an X-ray powder diffraction pattern comprising diffraction peaks having °2θ angle values independently selected from the group consisting of 7.8±0.2°, 14.3±0.2°, 16.6±0.2°, 17.2±0.2°, 19.3±0.2°, 21.7±0.2°, 23.3±0.2°, 26.4±0.2° and 28.2±0.2°.

In another embodiment, Form D has an X-ray powder diffraction pattern comprising diffraction peaks having °2θ angle values independently selected from the group consisting of 6.50±0.2°, 7.8±0.2°, 14.3±0.2°, 16.6±0.2°, 17.2±0.2°, 19.3±0.2°, 21.7±0.2°, 23.3±0.2°, 25.7±0.2°, 26.4±0.2° and 28.2±0.2°.

Figure 1A:
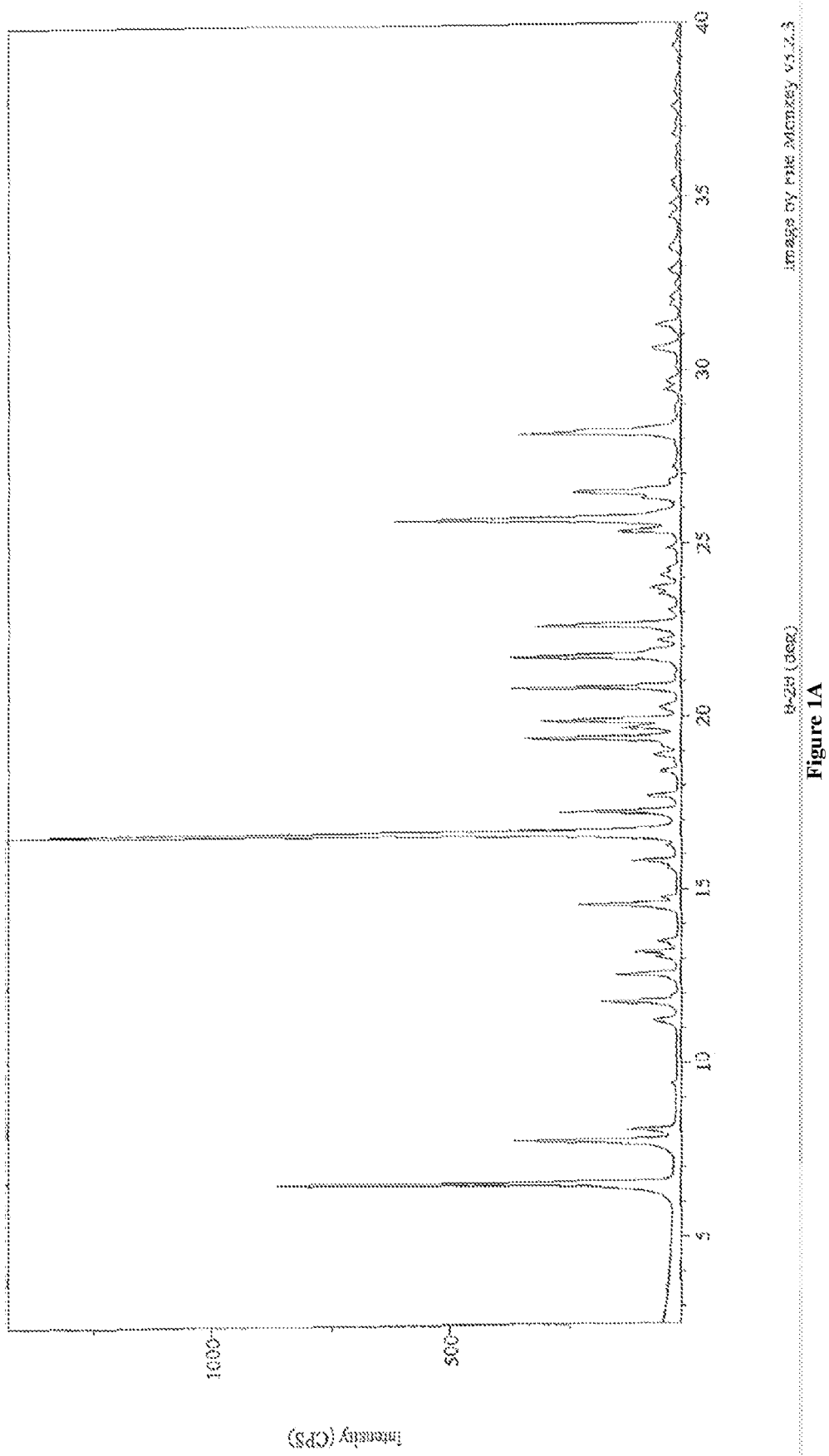
FIG. 1A illustrates an X-ray powder diffraction (XRPD) pattern of Crystalline Form D of Compound 1 (Compound 1 Form D) prepared according to Example 2A.

In another embodiment, Form D has an XRPD pattern substantially as shown in FIG. 1A.

Figure 1B:
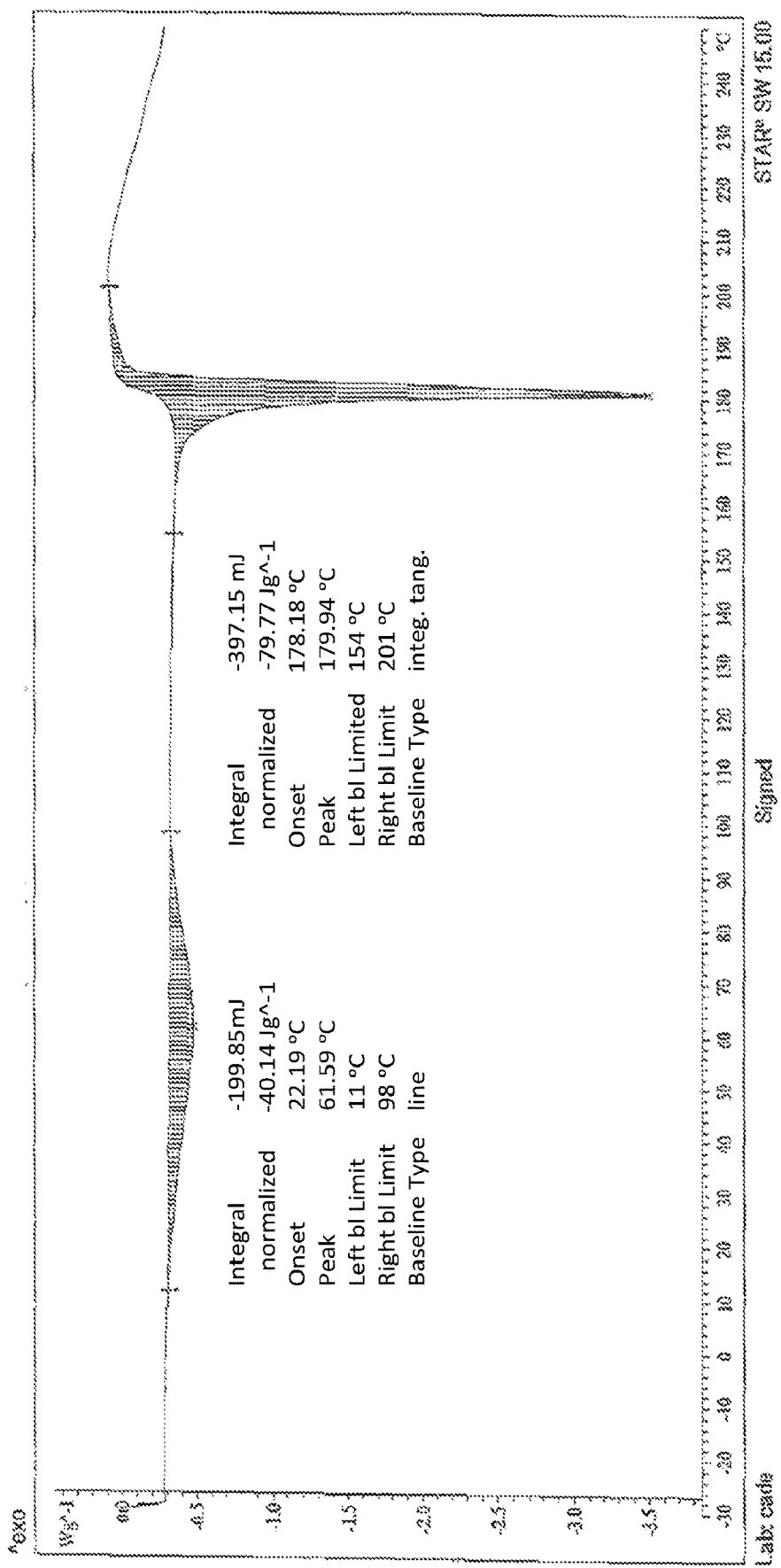
FIG. 1B illustrates a differential scanning calorimetry (DSC) profile of Crystalline Form D of Compound 1 (Compound 1 Form D) prepared according to Example 2A.

In another embodiment, Form D is characterized by having a broad small endotherm with a peak maximum at approximately 57° C. to 62° C. (onset ~20° C. to 22° C.) followed by a sharp endotherm with a peak maximum at approximately 180° C. (onset ~178° C.) by differential scanning calorimetry (DSC). In another embodiment, Form D has a DSC thermogram substantially as shown in FIG. 1B.

Figure 2B:
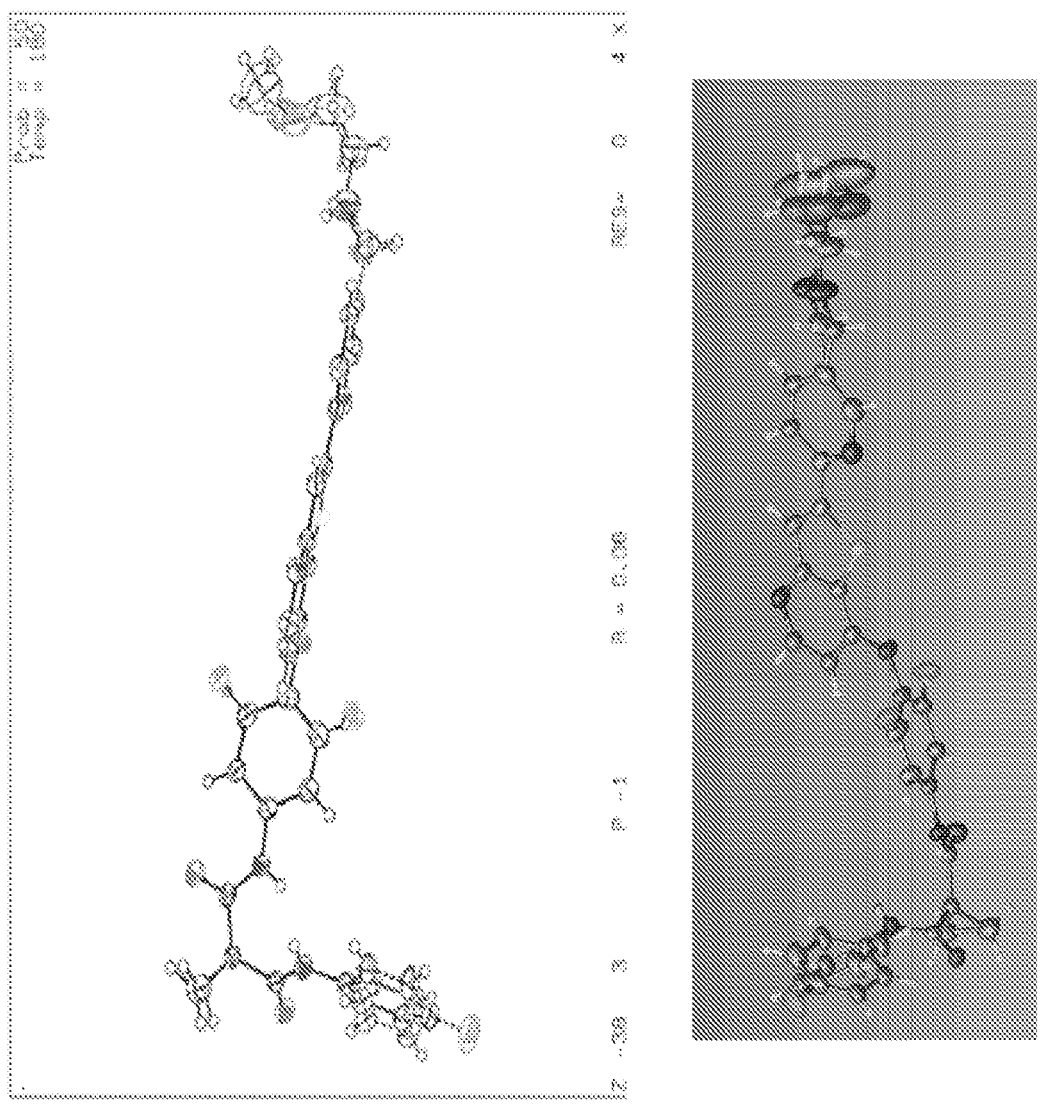
FIG. 2B illustrates the crystal structure of Crystalline Form D of Compound 1 (Compound 1 Form D, a single crystal) prepared according to Example 2B.
Figure 2C:
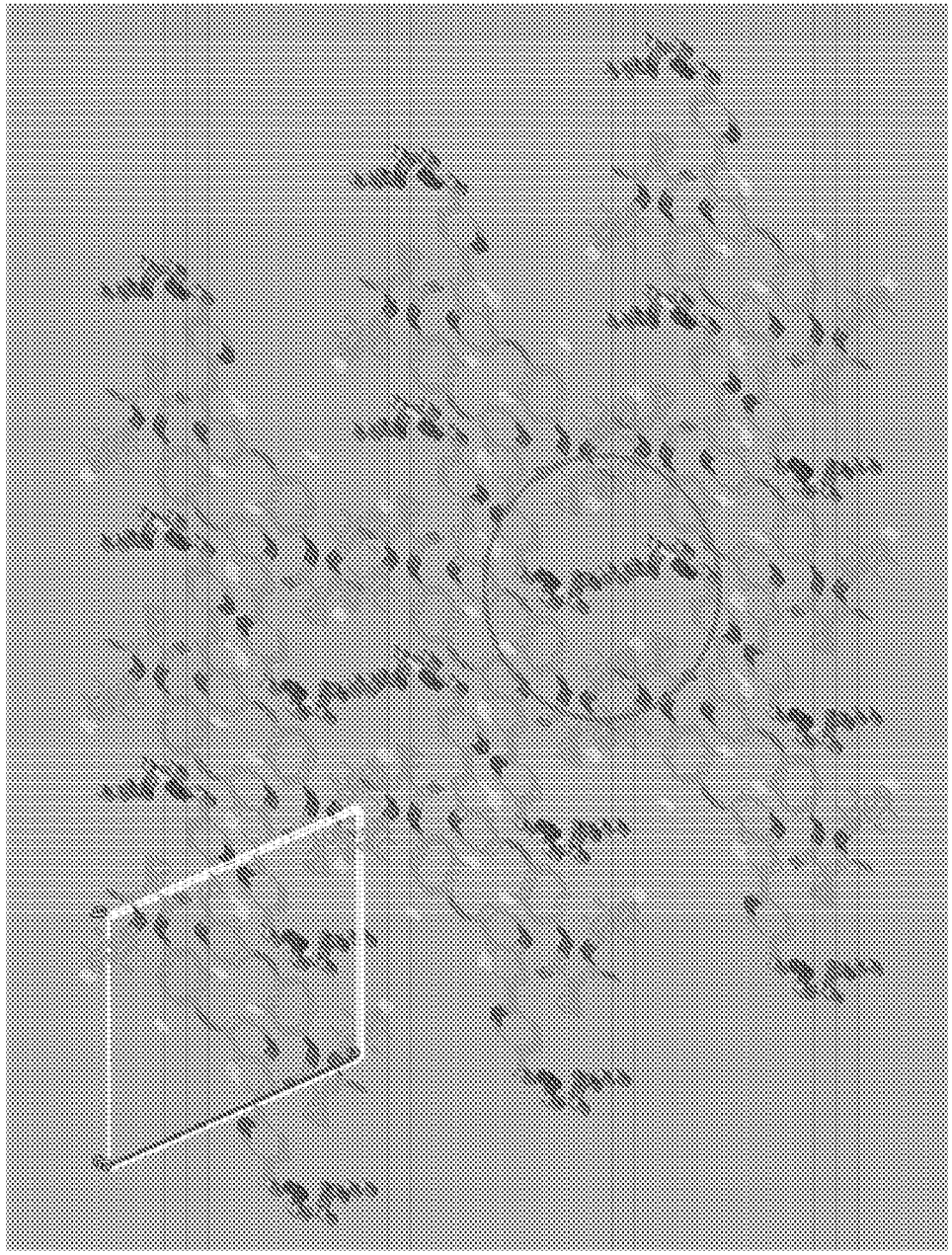
FIG. 2C illustrates the crystal packing of Crystalline Form D of Compound 1 (Compound 1 Form D, a single crystal) prepared according to Example 2B.

In one embodiment, Form D of Compound 1 can be a single crystal, which has a crystal structural data is summarized in Table 1B. As shown in FIG. 2B, the single crystal structure of Compound 1 Form D is in the P-1 space group and the triclinic crystal system. The terminal long alkyl chain is found to have large ellipsoids, indicating high mobility with disordered atoms. And some channels can be found around the alkyl chain in crystal packing, see FIG. 2C.

TABLE 1B

Crystal Data and Structure Refinement for Compound 1 Form D (a Single Crystal)

| Empirical formula | $C_{33}H_{29}F_2N_5O_4S$ |
| --- | --- |
| Formula weight | 629.67 |
| Temperature/K | 179.99(10) |
| Crystal system | triclinic |
| Space group | P-1 |
| a/Å | 9.4563(5) |
| b/Å | 12.3432(5) |
| c/Å | 14.4775(6) |
| α/° | 67.575(4) |
| β/° | 83.080(4) |
| γ/° | 80.099(4) |
| Volume/Å$^3$ | 1535.98(13) |
| Z | 2 |
| $\rho_{calc}$/cm$^3$ | 1.361 |
| µ/mm$^{-1}$ | 0.164 |
| F(000) | 656.0 |
| Crystal size/mm$^3$ | 0.22 × 0.16 × 0.12 |
| Radiation | Mo Kα (λ = 0.71073) |
| 2θ range for data collection/° | 5.184 to 54.958 |
| Index ranges | $-11 \leq h \leq 12, -15 \leq k \leq 16, -18 \leq l \leq 18$ |
| Reflections collected | 19644 |
| Independent reflections | 7025 [$R_{int}$ = 0.0232, $R_{sigma}$ = 0.0321] |
| Data/restraints/parameters | 7025/312/442 |
| Goodness-of-fit on F$^2$ | 1.036 |
| Final R indexes [I >= 2σ (I)] | $R_1$ = 0.0587, w$R_2$ = 0.1494 |
| Final R indexes [all data] | $R_1$ = 0.0780, w$R_2$ = 0.1599 |
| Largest diff. peak/hole/e Å$^{-3}$ | 0.96/-0.45 |

In another embodiment, Form D has an XRPD pattern substantially as shown in FIG. 2A(1).

Figure 3A:
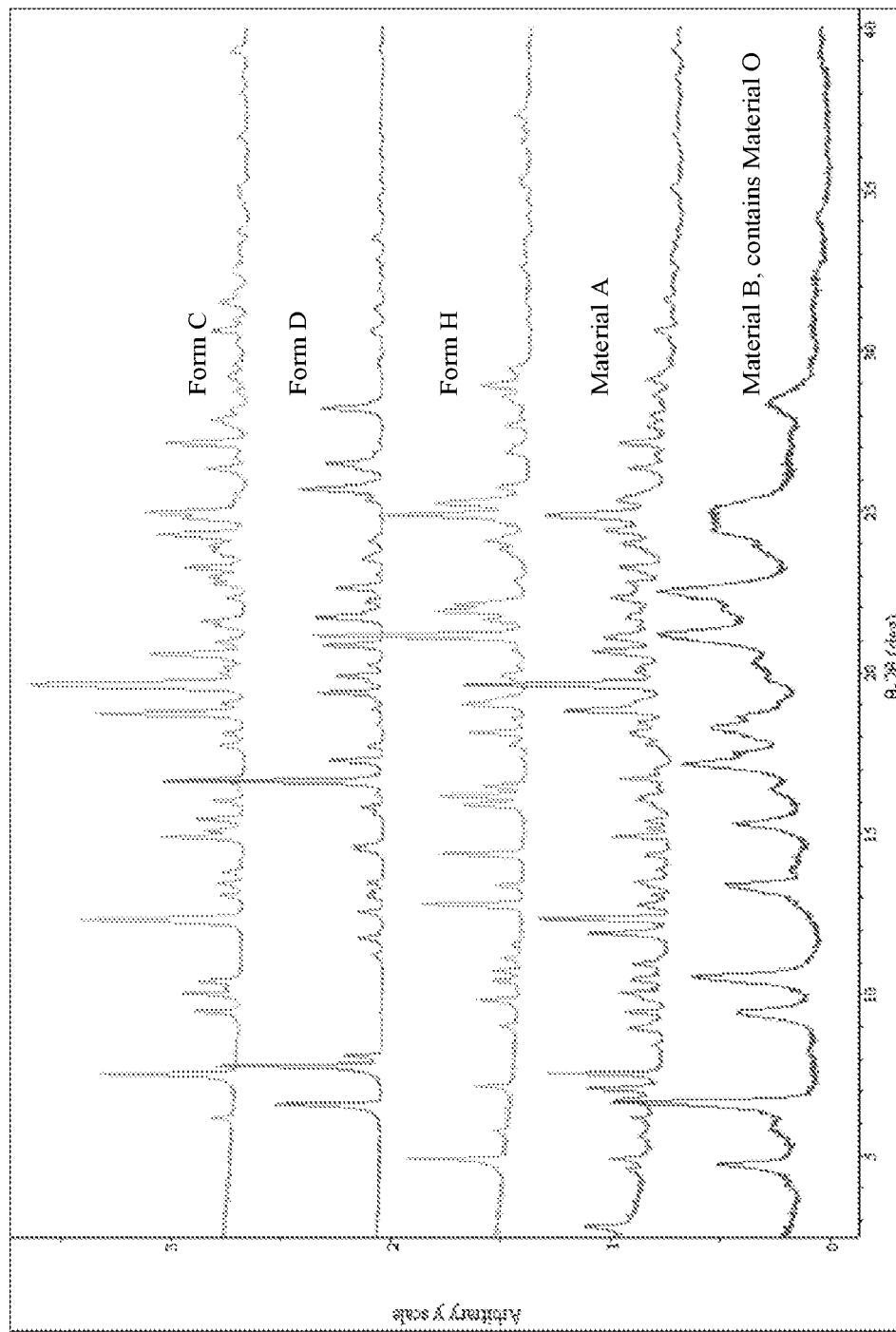
FIG. 3A illustrates an X-ray powder diffraction (XRPD) patterns of Crystalline Forms C, D and H of Compound 1 (Compound 1 Forms C, D and H) in Example 3.
Figure 3B:
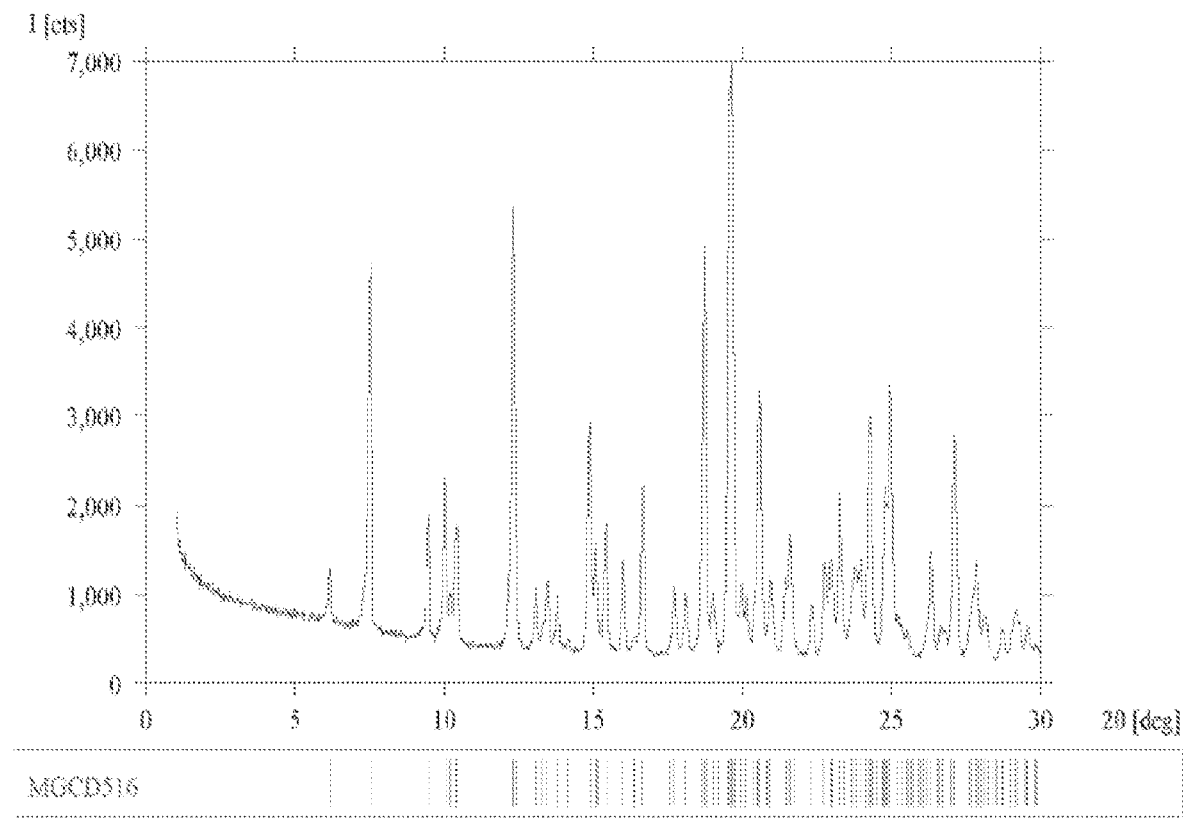
FIG. 3B illustrates an indexing solution for X-ray powder diffraction (XRPD) patterns of Crystalline Form C of Compound 1 (Compound 1 Form C) in Example 3.
Figure 3C:
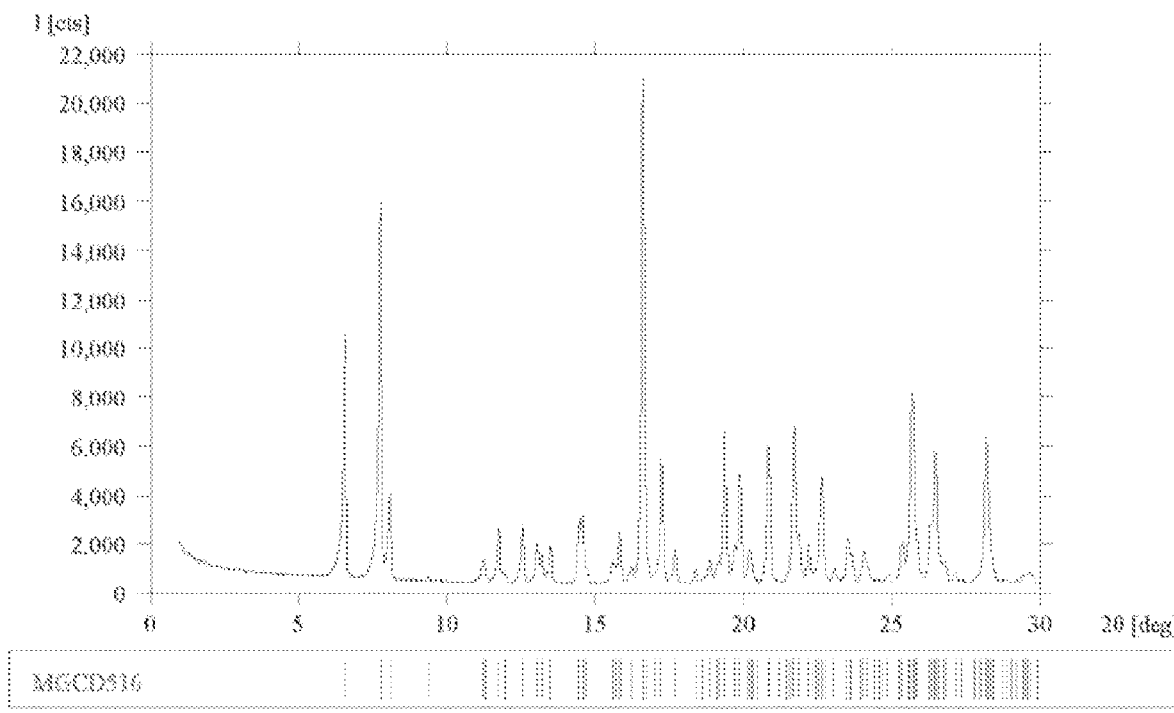
FIG. 3C illustrates an indexing solution for X-ray powder diffraction (XRPD) patterns of Crystalline Form D of Compound 1 (Compound 1 Form D) in Example 3.
Figure 3D:
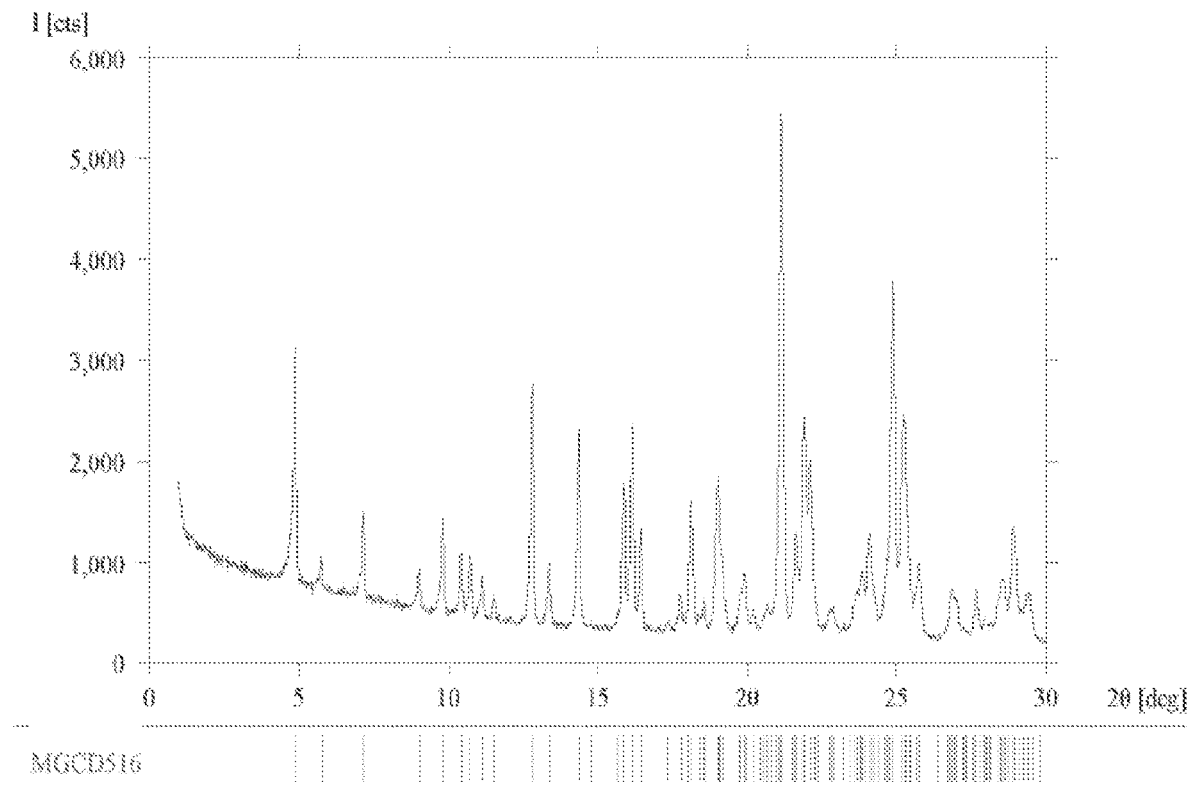
FIG. 3D illustrates an indexing solution for X-ray powder diffraction (XRPD) patterns of Crystalline Form H of Compound 1 (Compound 1 Form H) in Example 3.
Figure 3E:
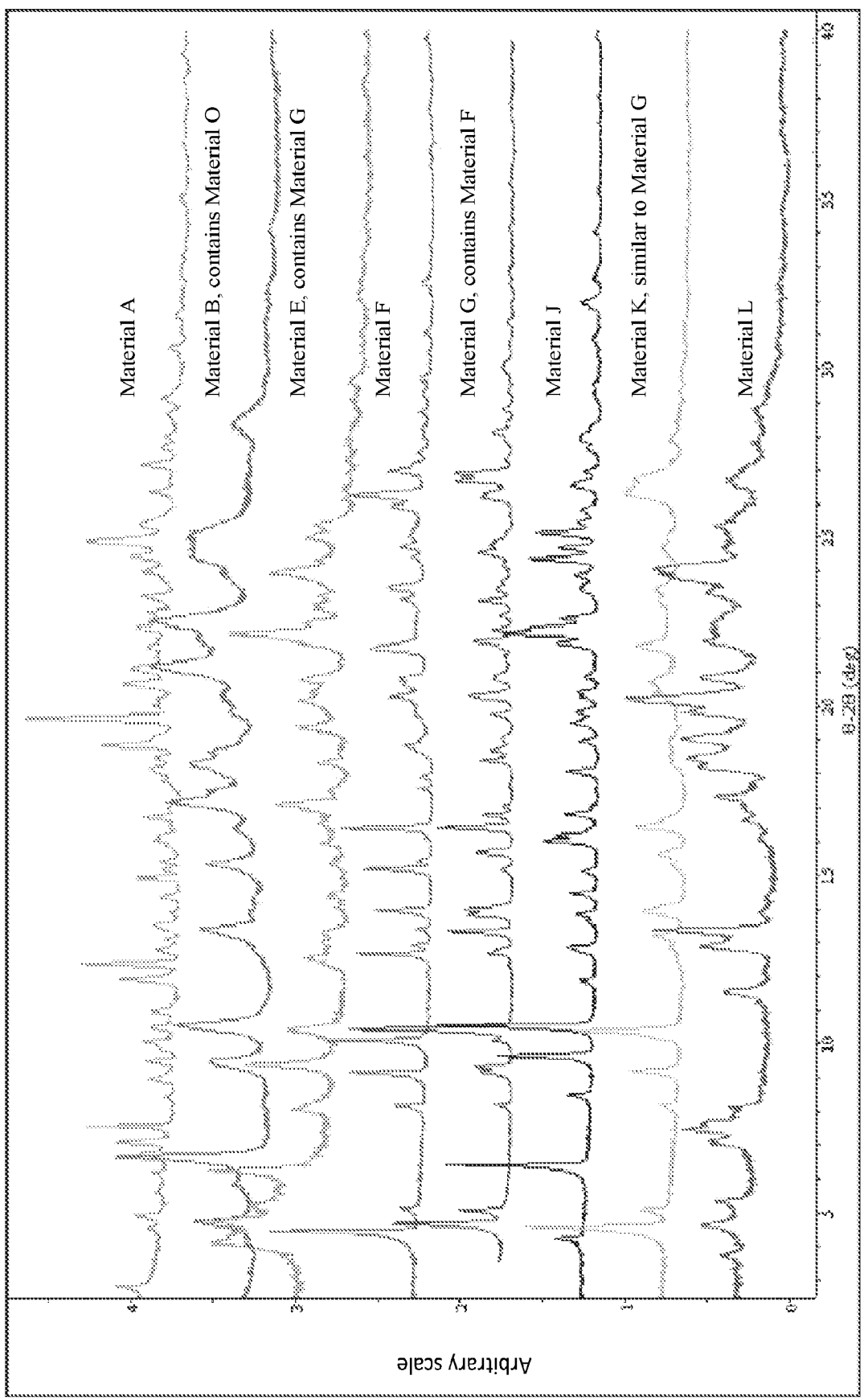
FIG. 3E the X-ray powder diffraction (XRPD) patterns of Materials A Through L of Compound 1 (Compound 1 Materials A Through L) in Example 3.
Figure 3F:
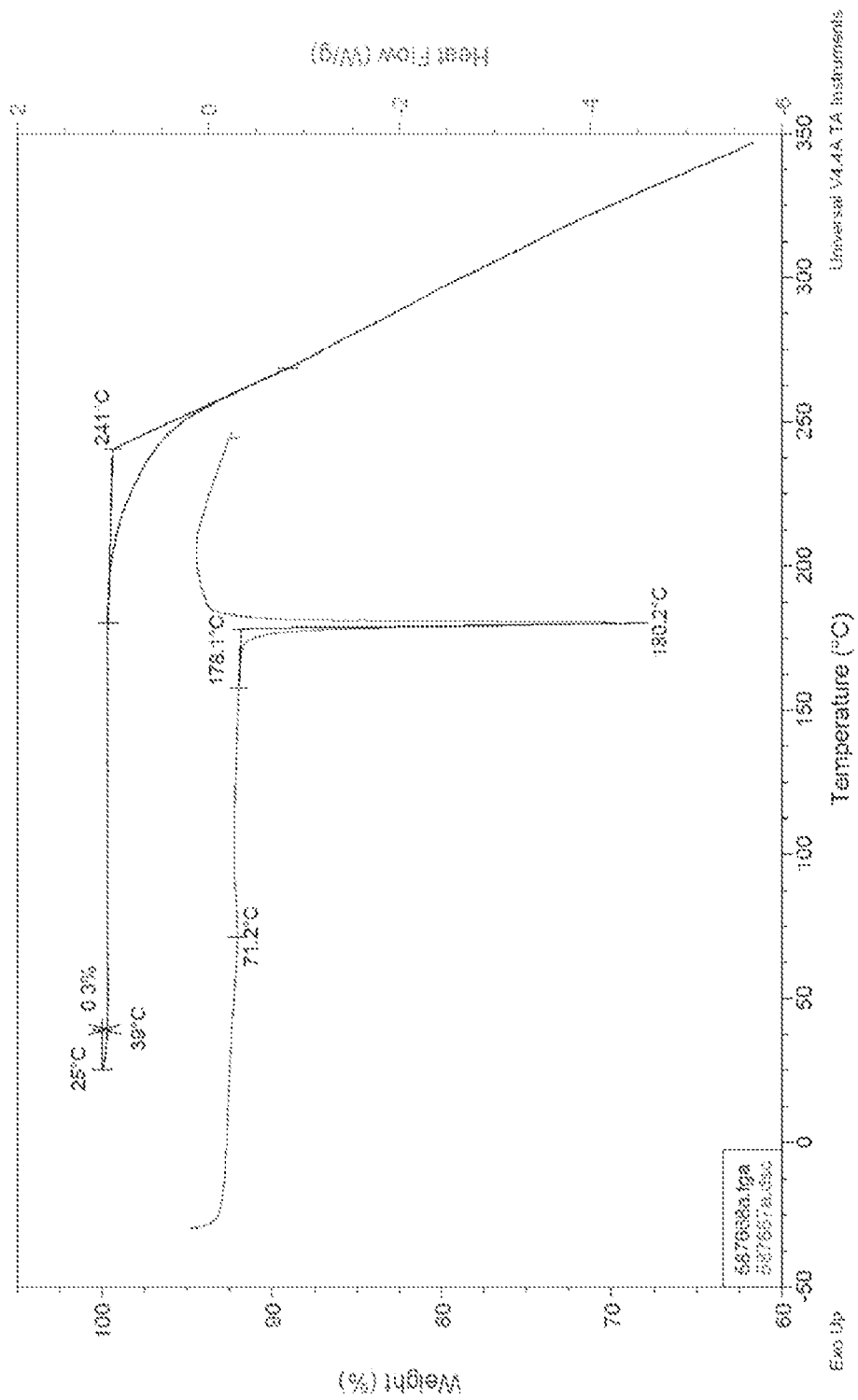
FIG. 3F illustrates TGA and DSC Thermograms for Crystalline Form D of Compound 1 (Compound 1 Form D) produced in acetone in Example 3. Sample was in vacuum dried at ~40° C. for ~2.5 hours.

In one embodiment, Form D has an XRPD pattern substantially as shown in FIG. 3C. In another embodiment, Form D has an DSC and/or TGA substantially as shown in FIG. 3F.

In one embodiment, the crystalline form of Compound 1 is designated as Form C. In another embodiment, Form C has an XRPD pattern substantially as shown in FIG. 3B.

In one embodiment, the crystalline form of Compound 1 is designated as Form H. In another embodiment, Form H has an XRPD pattern substantially as shown in FIG. 3D.

In one embodiment, the crystalline forms of the present invention are at least 40%, 50%, 60%, 70%, 80%, 90% or 95% purified crystalline form.

In second aspect of the invention, pharmaceutical compositions are provided for use in the methods comprising a therapeutically effective amount of a crystalline form of Compound 1, and pharmaceutically acceptable excipient. In one embodiment, the crystalline form of Compound 1 is selected from Form C, Form D and Form H. In another embodiment, the crystalline form of Compound 1 is Form D.

The crystalline forms of Compound 1 may be formulated by any method well known in the art and may be prepared for administration by any route, including, without limitation, parenteral, oral, sublingual, transdermal, topical, intranasal, intratracheal, or intrarectal. In certain embodiments, the crystalline form of Compound 1 is administered intravenously in a hospital setting. In one embodiment, administration may be by the oral route.

The characteristics of the carrier will depend on the route of administration. As used herein, the term "pharmaceutically acceptable" means a non-toxic material that is compatible with a biological system such as a cell, cell culture, tissue, or organism, and that does not interfere with the effectiveness of the biological activity of the active ingredient(s). Thus, compositions may contain, in addition to the inhibitor, diluents, fillers, salts, buffers, stabilizers, solubilizers, and other materials well known in the art. The preparation of pharmaceutically acceptable formulations is described in, e.g., Remington's Pharmaceutical Sciences, 18th Edition, ed. A. Gennaro, Mack Publishing Co., Easton, Pa., 1990.

In one embodiment, the pharmaceutical compostions of the present invention contain 95% of a crystalline form of Compound 1. In another embodiment, the pharmaceutical compositions of the present invention contain at least 95% of a crystalline form of Compound 1. In another embodiment, the pharmaceutical compositions of the present invention contain at least 90% of the crystalline form of Compound 1. In another embodiment, the pharmaceutical compositions of the present invention contain at least 80% of the crystalline form of Compound 1. In another embodiments, the pharmaceutical compositions of the present invention contain at least 70% of the crystalline form of Compound 1. In another embodiment, the pharmaceutical compositions of the present invention contain at least 60% of the crystalline form of Compound 1. In another embodiment, the pharmaceutical compositions of the present invention contain at least 50% of the crystalline form of Compound 1.

The pharmaceutical compositions comprising a crystalline form of Compound 1 may be used in the methods of use described herein.

In third aspect of the invention, provided herein are methods for inhibiting multi-tyrosine kinase activity in a cell, comprising contacting the cell in which inhibition of multi-tyrosine kinase activity is desired with a therapeutically effective amount of a crystalline form of Compound 1. In one embodiment, the crystalline form of Compound 1 is selected from Form C, Form D and Form H. In another embodiment, the crystalline form of Compound 1 is Form D.

In fourth aspect of the invention, provided herein are methods of treating cancer in a subject in need thereof, comprising administering to the subject a therapeutically effective amount of a crystalline form of Compound 1.

The compositions and methods provided herein may be used for the treatment of a wide variety of cancers. Examples of particular types of cancer include, but are not limited to, breast cancer, lung cancer, including non-small cell lung cancer (NSCLC), colon cancer, rectal cancer, bladder (urothelial) cancer, prostate cancer, leukemia, kidney (renal) cancer, glioma, sarcoma, including leiomyosarcoma, liver (hepatocellular) cancer, ovarian cancer and gastric cancer.

In one embodiment, the cancer is a multi-tyrosine kinase-associated cancer.

In one embodiment, the multi-tyrosine kinase-associated cancer is NSCLC, liposarcoma, urothelial carcinoma, and cancer of the oral cavity. In one embodiment, the multi-tyrosine kinase-associated cancer is non-small cell lung cancer (NSCLC).

The active compound is included in the pharmaceutically acceptable carrier or diluent in an amount sufficient to deliver to a patient a therapeutically effective amount without causing serious toxic effects in the patient treated. In one embodiment, a dose of the active compound for all of the above-mentioned conditions is in the range from about 0.6 to 1800 mg per day, for example 5 to 1000 mg per day, and as a further example 50 to 200 mg of the recipient per day. In one embodiment, the active compound is administered at a dose of 150 mg, preferably orally, and preferably in a continuous 21 day cycle. A typical topical dosage will range from 0.01-3% wt/wt in a suitable carrier. The effective dosage range of the pharmaceutically acceptable derivatives can be calculated based on the weight of the parent compound to be delivered. If the derivative exhibits activity in itself, the effective dosage can be estimated as above using the weight of the derivative, or by other means known to those skilled in the art.

In some embodiments of any of the methods described herein, before treatment with the compositions or methods of the invention, the patient was treated with one or more of a chemotherapy, a targeted anticancer agent, radiation therapy, and surgery, and optionally, the prior treatment was unsuccessful; and/or the patient has been administered surgery and optionally, the surgery was unsuccessful; and/or the patient has been treated with a platinum-based chemotherapeutic agent, and optionally, the patient has been previously determined to be non-responsive to treatment with the platinum-based chemotherapeutic agent; and/or the patient has been treated with a kinase inhibitor, and optionally, the prior treatment with the kinase inhibitor was unsuccessful; and/or the patient was treated with one or more other therapeutic agent(s).

In one embodiment, the multi-tyrosine kinase inhibitor is orally administered once daily. In one embodiment, the crystalline form of Compound 1 is orally administered twice daily. In one embodiment, the crystalline form of Compound 1 is orally administered once daily. In one embodiment, the crystalline form of Compound 1 is selected from Form C, Form D Form H. In another embodiment, the crystalline form of Compound 1 is Form D.

One skilled in the art will recognize that, both in vivo and in vitro trials using suitable, known and generally accepted cell and/or animal models are predictive of the ability of a test compound of the combination or the combination to treat or prevent a given disorder.

One skilled in the art will further recognize that human clinical trials including first-in-human, dose ranging and efficacy trials, in healthy patients and/or those suffering from a given disorder, may be completed according to methods well known in the clinical and medical arts.

In fifth aspect of the invention, provided herein is a process for the preparation of Crystalline Form D of N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide (Compound 1), comprising any one of the following procedures:

1) dissolving N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide in acetone, heating to reflux, cooling with stirring, to obtain Form D;

2) dissolving N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide, Form D as crystal seed in acetone, heating to reflux, cooling with stirring, to obtain Form D;

3) triturating N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide in an organic solvent at ambient temperature, filtering the slurries, replacing the organic solvent with fresh organic solvent, to obtain Form D, wherein the organic solvent is selected from acetone, ACN, CHCl$_3$, MTBE, DMF, EtOH, Nitromethane, or a mixture thereof;

4) dissolving N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide in THF, evaporating, dissolving in EtOAc, precipitating, to obtain Form D; and, 5) triturating N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide in IPA at ~40° C., filtering the slurries, replacing the IPA with fresh IPA, to obtain Form D.

In one embodiment, the process for the preparation of Crystalline Form D of N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide, comprising any one of the following procedures:

1) dissolving N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide, Form D as crystal seed in acetone, heating to reflux, cooling with stirring, to obtain Form D, heating to reflux for 1-2 h, cooling to an internal temperature of 20±5° C. for at least 24 h, filtering and washing the filter cake with acetone, drying under vacuum at ≤45° C., to obtain the Form D;

2) triturating N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide in an organic solvent at ambient temperature, filtering the slurries after approximately 24 hours, replacing the organic solvent with fresh organic solvent, to obtain Form D, wherein the organic solvent is selected from acetone, ACN, CHCl$_3$, MTBE, DMF, EtOH, nitromethane, or a mixture thereof;

3) dissolving N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide in THF, evaporating, dissolving in EtOAc, stirring, precipitating, to obtain Form D;

4) triturating N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide in IPA at ~40° C., filtering the slurries after approximately 24 hours, replacing the IPA with fresh IPA, to obtain Form D.

In another embodiment, the organic solvent is selected from CHCl$_3$/MTBE (50/50, v/v) and DMF/ACN (30/70, v/v). In another embodiment, the resulting slurries were triturated for up to ~2.5 weeks.

Definitions

Unless defined otherwise, all technical and scientific terms used herein have the same meaning as is commonly understood by one of skill in the art to which this invention belongs. All patents, patent applications, and publications referred to herein are incorporated by reference.

As used herein, "Compound 1" refers to N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide.

As used herein, a "crystalline form of Compound 1" refers to the crystalline form of N-(3-fluoro-4-((2-(5-(((2- methoxyethyl)amino)methyl)pyridin-2-yl)thieno[3,2-b] pyridin-7-yl)oxy)phenyl)-N-(4-fluorophenyl)cyclopropane-1,1-dicarboxamide.

Materials exhibiting unique crystalline XRPD patterns are assigned sequential Roman alphabetical characters as the default designation, if no other character types already pertain to the compound. The designation is tentatively associated with the term 'Material' until the phase purity obtained through indexing of the XRPD pattern, and chemical identity obtained through proton nuclear magnetic resonance spectroscopy (1H NMR) is determined. When the characterization data are consistent with a unique crystalline form composed of a single phase Materials are further designated as "Forms" with the same letter designation (i.e., Material C becomes Form C). In the present invention, the XRPD pattern of a "Form" of the compound can be successfully indexed. But, the XRPD pattern of a "Material" cannot be indexed, the "Material" is a crystalline material with some degree of disorder, or a mixture.

As used herein, the term "Form C" or "Crystalline Form C" when used alone refers to Crystalline Form C of N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide. And, the terms "Form D" or "Crystalline Form D" have similar meaning as that of "Form C" or "Crystalline Form C".

A "multi-tyrosine kinase-associated disease or disorder" as used herein refers to diseases or disorders associated with or mediated by oncogenic driver mutations in RET, CBL, CHR4q12, DDR and/or Trk.

As used herein, the term "subject," "individual," or "patient," used interchangeably, refers to any animal, including mammals such as mice, rats, other rodents, rabbits, dogs, cats, swine, cattle, sheep, horses, primates, and humans. In some embodiments, the patient is a human. In some embodiments, the subject has experienced and/or exhibited at least one symptom of the disease or disorder to be treated and/or prevented. In some embodiments, the subject is suspected of having a multi-tyrosine kinase-associated cancer.

As used herein, a "therapeutically effective amount" of a crystalline form of Compound 1 is an amount that is sufficient to ameliorate, or in some manner reduce a symptom or stop or reverse progression of a condition, or negatively modulate or inhibit the activity of a multi-tyrosine kinase. Such amount may be administered as a single dosage or may be administered according to a regimen, whereby it is effective.

As used herein, "treatment" means any manner in which the symptoms or pathology of a condition, disorder or disease are ameliorated or otherwise beneficially altered. Treatment also encompasses any pharmaceutical use of the compositions herein.

As used herein, amelioration of the symptoms of a particular disorder by administration of a particular pharmaceutical composition refers to any lessening, whether permanent or temporary, lasting or transient that can be attributed to or associated with administration of the composition.

As used herein, the term "about" when used to modify a numerically defined parameter (e.g., the dose of a crystalline form of Compound 1 detailed herein or a pharmaceutically acceptable salt thereof, or the length of treatment time described herein) means that the parameter may vary by as much as 10% below or above the stated numerical value for that parameter. For example, a dose of about 5 mg/kg may vary between 4.5 mg/kg and 5.5 mg/kg. "About" when used at the beginning of a listing of parameters is meant to modify each parameter. For example, about 0.5 mg, 0.75 mg or 1.0 mg means about 0.5 mg, about 0.75 mg or about 1.0 mg. Likewise, about 5% or more, 10% or more, 15% or more, 20% or more, and 25% or more means about 5% or more, about 10% or more, about 15% or more, about 20% or more, and about 25% or more.

As used herein, the term "about" when used in reference to XRPD peak positions refers to the inherent variability of peaks depending on the calibration of the instrument, processes used to prepare the crystalline forms of the present invention, age of the crystalline forms and the type of instrument used in the analysis. The variability of the instrumentation used for XRPD analysis was about ±0.2°2θ.

As used herein, the term "about" when used in reference to DSC endothermic peak onset refers to the inherent variability of peaks depending on the calibration of the instrument, method used to prepare the samples of the present invention, and the type of instrument used in the analysis. The variability of the instrumentation used for DSC analysis was about ±2° C.

GENERAL METHODS

The general methods outlined below were used in the exemplified Examples, unless otherwise noted.

I. Crystallization Techniques

Crystalline forms of the present invention may be prepared using a variety of methods well known to those skilled in the art including crystallization or recrystallization from a suitable solvent or by sublimation. A wide variety of techniques may be employed, including those in the exemplified Examples, for crystallization or recrystallization including evaporation of a water-miscible or a water-immiscible solvent, crystal seeding in a supersaturated solvent mixture, decreasing the temperature of the solvent mixture, or freeze drying the solvent mixture.

In the present invention, crystallization may be done with or without crystal seed. The crystal seed may come from any previous batch of the desired crystalline form. The addition of crystal seed may not affect the preparation of the crystalline forms in the present invention.

The sample was recovered after completion of the isotherm and re-analyzed by XRPD.

ABBREVIATIONS and ACRONYMS

| Category | Abbreviations | Full Name/Description |
|---|---|---|
| Analytical Techniques | DSC | Differential Scanning Calorimetry |
| | DVS | Dynamic Vapor Sorption |
| | NMR | Nuclear Magnetic Resonance |
| | PLM | Polarized light microscopy |
| | TGA | Thermogravimetric Analysis |
| | XRPD | X-ray Powder Diffraction |
| | VT-XRPD | Variable Temperature X-ray Powder Diffraction |
| Solvent | ACN | Acetonitrile |
| | $CHCl_3$ | Chloroform |
| | DMF | Dimethylforamide |
| | DMSO | Dimethylsulfoxide |
| | EtOAc | Ethyl acetate |
| | EtOH | Ethanol |

| Category | Abbreviations | Full Name/Description |
|---|---|---|
| | IPA | Isopropyl alcohol |
| | MEK | Methyl ethyl ketone |
| | MeOH | Methanol |
| | MTBE | Methyl-tert-butyl ether |
| | THF | Tetrahydrofuran |
| Other | RT | Room temperature |
| | v/v | percent volume ratio |

The following Examples are intended to illustrate further certain embodiments of the invention and are not intended to limit the scope of the invention.

Example 1

Preparation of N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide (Compound 1)

This Example illustrates the preparation of N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide (Compound 1).

Step 1: N-((6-bromopyridin-3-yl)methyl)-2-methoxyethan-1-amine (Compound 1A)

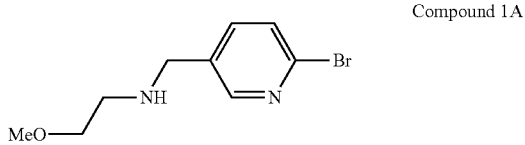 [SMILES: COCCNCc1ccc(Br)nc1]

Compound 1A

To a stirred solution of 2-Methoxyethylamine (3.0 eq) in dichloromethane (DCM) (12 vol) was added Molecular sieves (0.3 w/w) and stirred for 2 hours at 25±5° C. under nitrogen atmosphere. The reaction mass water content was monitored by Karl Fischer analysis until the water content limit reached 0.5% w/w. Once the water content limit was reached, the reaction mass cooled to 5±5° C. and 6-bromonicotinaldehyde (1.0 eq) was added lot wise over period of 30 minutes to the above reaction mass at 5±5° C. The reaction mass was stirred for 30±5 minutes at 5±5° C. and acetic acid (1.05 eq) was added drop wise at 5±5° C. After completion of the addition, the mass was slowly warmed to 25±5° C. and stirred for 8 h to afford Compound 1A. The imine formation was monitored by HPLC.

Step 2: tert-butyl ((6-bromopyridin-3-yl)methyl)(2-methoxyethyl)carbamate (Compound 1B)

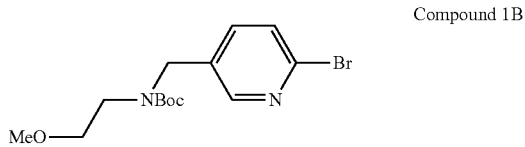 [SMILES: COCCN(Cc1ccc(Br)nc1)C(=O)OC(C)(C)C]

Compound 1B

Charged Compound 1A (1.0 eq) in THF (5.0 vol) was added and the reaction mass was stirred for 30 minutes at 25±5° C. under nitrogen atmosphere. The reaction mass was cooled to temperature of about 10±5° C. Di-tert-butyl dicarbonate (1.2 eq) was added to the reaction mass at 10±5° C. under nitrogen atmosphere and the reaction mass temperature was raised to 25±5° C. and the reaction mass for about 2 hours. The progress of the reaction was monitored by HPLC. After IPC completion, a prepared solution of Taurine (1.5 eq) in 2M aq NaOH (3.1 vol) was charged and stirred at 10±5° C. for 16 h to 18 h. The reaction mass was further diluted with 1M aq.NaOH solution (3.7 vol) and the layers were separated. The aqueous layer was extracted with DCM (2×4.7 vol) and the extract combined with the organic layer. The combined organic layers were washed with 1M aq.NaOH solution (3.94 vol), followed by water (2×4.4 vol), and dried over sodium sulfate (2.0 w/w). The filtrate was concentrated under reduced pressure below 40° C. until no distillate was observed. Tetrahydrofuran (THF) was sequentially added (1×4 vol and 1×6 vol) and concentrated under reduced pressure below 40° C. until no distillate was observed to obtained Compound 1B as light yellow colored syrup liquid.

Step 3: tert-butyl ((6-(7-chlorothieno[3,2-b]pyridin-2-yl)pyridin-3-yl)methyl)(2-methoxyethyl)carbamate (Compound 1C)

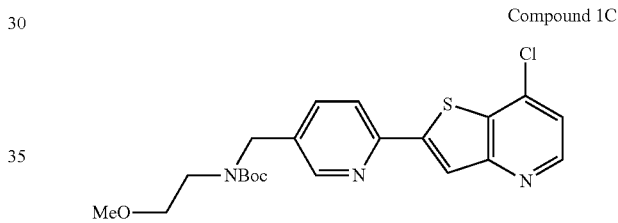

Compound 1C

To a stirred solution of 7-chlorothieno[3,2-b]pyridine (1.05 eq) in tetrahydrofuran (7 vol) was added n-butyl lithium (2.5 M in hexane) drop wise at −15±10° C. and stirred for 90 minutes at same temperature under nitrogen atmosphere. Zinc chloride (1.05 eq) was added to the reaction mass at −15±10° C. The reaction mass was slowly warmed to 25±5° C. and stirred for 45 minutes under nitrogen atmosphere to afford Compound 1C. The progress of the reaction was monitored by HPLC.

Step 4: tert-butyl ((6-(7-(4-amino-2-fluorophenoxy)thieno[3,2-b]pyridin-2-yl)pyridin-3-yl)methyl)(2-methoxyethyl)carbamate (Compound 1D)

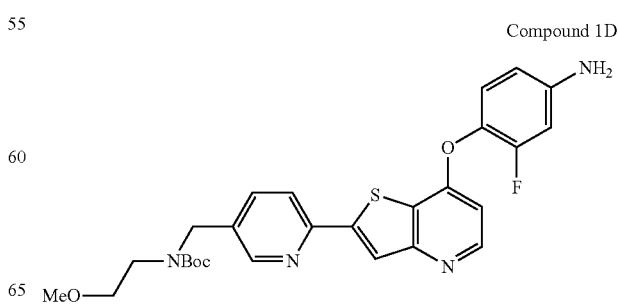

Compound 1D 3-fluoro-4-hydroxybenzenaminium chloride (1.2 eq) in DMSO (3.9 vol) at 25±5° C. was charged under nitrogen atmosphere and the reaction mass was stirred until observance of a clear solution at 25±5° C. t-BuOK was added lot wise under nitrogen atmosphere at 25±10° C. The reaction mass temperature was raised to 45±5° C. and maintained for 30 minutes under nitrogen atmosphere. Compound 1C was charged lot-wise under nitrogen atmosphere at 45±5° C. and stirred for 10 minutes at 45±5° C. The reaction mixture was heated to 100±5° C. and stirred for 2 hrs. The reaction mass is monitored by HPLC.

After reaction completion, the reaction mass was cooled to 10±5° C. and quenched with chilled water (20 vol) at 10±5° C. The mass temperature was raised to 25±5° C. and stirred for 7-8 h. The resulting Compound 1D crude was collected by filtration and washed with 2 vol of water. Crude Compound 1D material taken in water (10 vol) and stirred for up to 20 minutes at 25±5° C. The reaction mass was heated to 45±5° C. and stirred for 2-3 h at 45±5° C., filtered and vacuum-dried.

Crude Compound 1D was taken in MTBE (5 vol) at 25±5° C. and stirred for about 20 minutes at 25±5° C. The reaction mass temperature was raised to 45±5° C., stirred for 3-4 h at 45±5° C. and then cooled to 20±5° C. The reaction mass was stirred for about 20 minutes at 20±5° C., filtered, followed by bed wash with water (0.5 vol) and vacuum-dried.

The crude material was dissolved in acetone (10 vol) at 25±5° C. and stirred for about 2 h at 25±5° C. The reaction mass was filtered through a celite bed and washed with acetone (2.5 vol). The filtrate was slowly diluted with water (15 vol) at 25±5° C. The reaction mass was stirred for 2-3 h at 25±5° C., filtered and bed washed with water (2 vol) & vacuum-dried to afford Compound 1D as brown solid.

Step 5: 1-((4-((2-(5-(((tert-butoxycarbonyl)(2-methoxyethyl)amino)methyl)pyridin-2-yl)thieno[3,2-b]pyridin-7-yl)oxy)-3-fluorophenyl)carbamoyl)cyclopropane-1-carboxylic acid (Compound 1E)

To a solution of Compound 1D (1.0 eq.) in tetrahydrofuran (7 vol.), aqueous potassium carbonate (1.0 eq.) in water (8 vol.) was added. The solution was cooled to 5±5° C., and stirred for about 60 min. While stirring, separately triethylamine (2.0 eq.) was added to a solution of 1,1-cyclopropanedicarboxylic acid (2.0 eq.) in tetrahydrofuran (8 vol.), at 5±5° C., followed by thionyl chloride (2.0 eq.) and stirred for about 60 min. The acid chloride mass was slowly added to the Compound 1D solution at 5±5° C. The temperature was raised to 25±5° C. and stirred for 3.0 h. The reaction was monitored by HPLC analysis.

After reaction completion, the mass was diluted with ethyl acetate (5.8 vol.), water (5.1 vol.), 10% (w/w) aqueous hydrochloric acid solution (0.8 vol.) and 25% (w/w) aqueous sodium chloride solution (2 vol.). The aqueous layer was separated and extracted with ethyl acetate (2×5 vol.). The combined organic layers were washed with a 0.5M aqueous sodium bicarbonate solution (7.5 vol.). The organic layer was treated with Darco activated charcoal (0.5 w/w) and sodium sulfate (0.3 w/w) at 25±5° C. for 1.0 h. The organic layer was filtered through celite and washed with tetrahydrofuran (5.0 vol.). The filtrate was concentrated under vacuum below 50° C. to about 3 vol and co-distilled with ethyl acetate (2×5 vol.) under vacuum below 50° C. up to ~3.0 vol. The organic layer was cooled to 15±5° C., stirred for about 60 min., filtered, and the solid was washed with ethyl acetate (2.0 vol.). The material was dried under vacuum at 40±5° C. until water content was less than 1% to afford Compound 1E as brown solid.

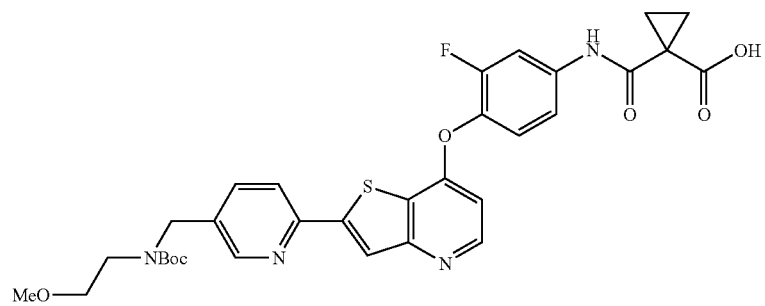

Compound 1E

Step 6: tert-butyl ((6-(7-(2-fluoro-4-(1-((4-fluoro-phenyl)carbamoyl)cyclopropane-1-carboxamido)phenoxy)thieno[3,2-b]pyridin-2-yl)pyridin-3-yl)methyl)(2-methoxyethyl)carbamate (Compound 1F)

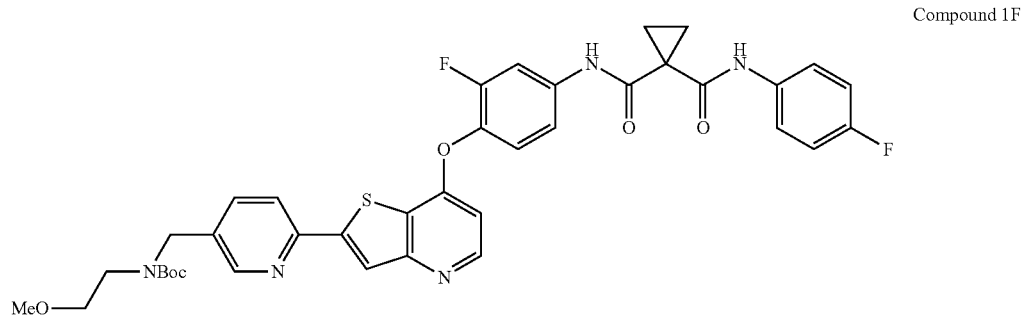 [SMILES: COCCN(Cc1ccc(-c2cc3nccc(Oc4ccc(NC(=O)C5(C(=O)Nc6ccc(F)cc6)CC5)cc4F)c3s2)nc1)C(=O)OC(C)(C)C]

Compound 1F

Pyridine (1.1 eq.) was added to a suspension of Compound 1E (1.0 eq.) in tetrahydrofuran (10 vol.) and cooled to 5±5° C. Thionyl chloride (2.0 eq.) was added and stirred for about 60 min. The resulting acid chloride formation was confirmed by HPLC analysis after quenching the sample in methanol. Separately, aqueous potassium carbonate (2.5 eq.) solution (7.0 vol. of water) was added to a solution of 4-fluoroaniline (3.5 eq.) in tetrahydrofuran (10 vol.), cooled to 5±5° C., and stirred for about 60 min. The temperature of the acid chloride mass at 5±5° C. was raised to a temperature of about 25±5° C. and stirred for 3 h. The reaction monitored by HPLC analysis.

After completion of the reaction, the solution was diluted with ethyl acetate (25 vol.), the organic layer was separated and washed with a 1M aqueous sodium hydroxide solution (7.5 vol.), a 1M aqueous hydrochloric acid solution (7.5 vol.), and a 25% (w/w) aqueous sodium chloride solution (7.5 vol.). The organic layer was dried and filtered with sodium sulfate (1.0 w/w). The filtrate was concentrated ~3 vol under vacuum below 50° C. and co-distilled with ethyl acetate (3×5 vol.) under vacuum below 50° C. to ~3.0 vol. Ethyl acetate (5 vol.) and MTBE (10 vol.) were charged, heated up to 50±5° C. and stirred for 30-60 min. The mixture was cooled to 15±5° C., stirred for about 30 min., filtered, and the solid was washed with ethyl acetate (2.0 vol.). MGB3 content was analyzed by HPLC analysis. The material was dried under vacuum at 40±5° C. until the water content reached about 3.0% to afford Compound 1F as brown solid.

Step 7: N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide (Compound 1)

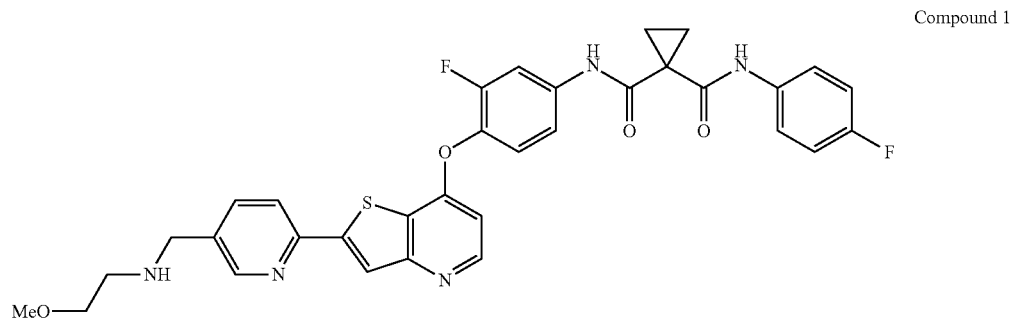 [SMILES: COCCNCc1ccc(-c2cc3nccc(Oc4ccc(NC(=O)C5(C(=O)Nc6ccc(F)cc6)CC5)cc4F)c3s2)nc1]

Compound 1

To a mixture of Compound 1F in glacial acetic acid (3.5 vol.) concentrated hydrochloric acid (0.5 vol.) was added and stirred at 25±5° C. for 1.0 h. The reaction was monitored by HPLC analysis.

After reaction completion, the mass was added to water (11 vol.) and stirred for 20±5° C. for 30 min. The pH was adjusted to 3.0±0.5 using 10% (w/w) aqueous sodium bicarbonate solution and stirred for 20±5° C. for approximately 3.0 h. The mass was filtered, washed with water (4×5.0 vol.) and the pH of filtrate was checked after every wash. The material was dried under vacuum at 50±5° C. until water content was about 10%.

Crude Compound 1 was taken in ethyl acetate (30 vol.), heated to 70±10° C., stirred for 1.0 h., cooled to 25±5° C., filtered, and washed with ethyl acetate (2 vol.). The material was dries under vacuum at 45±5° C. for 6.0 h.

Crude Compound 1 was taken in polish filtered tetrahydrofuran (30 vol.) and pre-washed Amberlyst A-21 Ion exchange resin and stirred at 25±5° C. until the solution became clear. After getting the clear solution, the resin was filtered and washed with polish filtered tetrahydrofuran (15 vol.). The filtrate was concentrated by ~50% under vacuum below 50° C. and co-distilled with polish filtered IPA (3×15.0 vol.) and concentrated up to ~50% under vacuum below 50° C. Charged polish filtered IPA (15 vol.) was added and the solution concentrated under vacuum below 50° C. to ~20 vol. The reaction mass was heated to 80±5° C., stirred for 60 min. and cooled to 25±5° C. The resultant reaction mass was stirred for about 20 hours at 25±5° C. The reaction mass was cooled to 0±5° C., stirred for 4-5 hours, filtered, and washed with polish filtered IPA (2 vol.). The material was dried under vacuum at 45±5° C., until the water content was about 2%, to obtain the desired product Compound 1.
$^1$H-NMR (400 MHz, DMSO-d6): δ 10.40 (s, 1H), 10.01 (s, 1H), 8.59-8.55 (m, 1H), 8.53 (d, J=5.6 Hz, 1H), 8.32 (s, 1H), 8.23 (d, J=8.0 Hz, 1H), 7.96-7.86 (m, 2H), 7.70-7.60 (m, 2H), 7.56-7.43 (m, 2H), 7.20-7.11 (m, 2H), 6.66 (d, J=5.6 Hz, 1H), 3.78 (s, 2H), 3.41 (t, J=5.6 Hz, 2H), 3.25 (s, 3H), 2.66 (t, J=5.6 Hz, 2H), 1.48 (s, 4H) ppm. MS: M/e 630 (M+1)$^+$.

Example 2

Preparation of Crystalline Form D of N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide Example 2A: Preparation of Compound 1 Crystalline Form D To a 50 L reactor, 7.15 Kg of Compound 1, 40 g of Form D as crystal seed and 21 L acetone (≥99%) were added. The mixture was heated to reflux (~56° C.) for 1~2 h. The mixture was agitated with an internal temperature of 20±5° C. for at least 24 h. Then, the suspension was filtered and washed the filter cake with 7 L acetone. The wet cake was dried under vacuum at ≤45° C., to obtain 5.33 kg of Compound 1 of desired Form D X-Ray Powder Diffraction (XRPD)

The XRPD patterns were collected with a PAN alytical X'Pert PRO MPD diffractometer using auincident beam of Cu radiation produced using au Optix long, fine-focus source. An elliptically graded multilayer mirror was used to focus Cu Kα X-rays through the specimens and onto the detector. Prior to the analysis, a silicon specimen (NIST SRM 640e) was analyzed to verify the observed position of the Si Ill peak is consistent with the NIST-certified position. A specimen of each sample was sandwiched between 3-µm-thick films and analyzed in transmission geometly. A beam-stop, short autiscatter extension, and an autiscatter knife edge were used to minimize the background generated by air. Soller slits for the incident aud diffracted beauls were used to minimize broadening from axial divergence. The diffraction patterns were collected using a scanning position-sensitive detector (X'Celerator) located 240 mm from the specimens and Data Collector software v. 2.2b. Pattern Match v2.3.6 was used to create XRPD patterns.

The X-ray powder diffraction (XRPD) pattern was used to characterize the Compound 1 obtained, which showed that the Compound 1 was in Crystalline Form D of Compound 1 (Compound 1 Form D), see FIG. 1A. The XRPD pattern yielded is substantially the same as that shown in FIG. 3C.

Differential Scanning Calorimetry (DSC)

DSC was performed using a Mettler-Toledo DSC3+ differential scanning calorimeter. Temperature calibration was performed using octane, phenyl salicylate, indium, tin, and zinc. The TAWN sensitivity was 11.9. The samples were placed into aluminum DSC pans, covered with lids, and the weights were accurately recorded. A weighed aluminum pan configured as the sample pan was placed on the reference side of the cell. The pan lids were pierced prior to sample analyses. The method name on the thermograms is an abbreviation for the start and end temperature as well as the heating rate; e.g., –30-250-10 means "from ambient to 250° C., at 10° C./min." The nitrogen flow rate was 50.0 mL/min. This instrument does not provide gas pressure value as required by USP because it is the same as atmospheric pressure.

A broad small endotherm with a peak maximum at approximately 57° C. to 62° C. (onset ~20° C. to 22° C.) followed by a sharp endotherm with a peak maximum at approximately 180° C. (onset ~178° C.) were observed. These events could be due to the loss of volatiles and a melt, respectively (see FIG. 1B).

In an alternative embodiment, Form D was prepared as follows. Designated Material O was suspended in 600 µL of acetone. Initial dissolution was observed followed by re-precipitation. The amount of suspended solids was not measured, because the target of the experiment was to get a suspension with enough solids to slurry, isolate and collect XRPD data. Based on the solubility of Form D in acetone, a very rough estimate for the scale of the experiment is about 80-100 mg. The suspension was stirred at ambient temperature for approximately 2.5 weeks, after which the solids were isolated by centrifugation with filtration. XRPD data appeared to be consistent with Form D. The sample was then dried in vacuum oven at ~40° C. for ~2.5 hours. The XRPD pattern of the final solids was consistent with Form D.

Example 2B: Preparation of Compound 1 Form D 427.0 mg of Compound 1 was dissolved in 5 mL of THF to obtain a clear brown solution. The resulting solution was filtered, and the filtrate evaporated under flow of nitrogen. A sticky solid was obtained, which was dried under vacuum in room temperature for ~5 min, still a sticky brown solid obtained. It was dissolved in 0.2 mL of EtOAc and sonicated to dissolve. The solution obtained was stirred at room temperature for 15 min and a solid precipitated. The resulting solid was added 0.4 mL of EtOAc and stirred in room temperature for 21 h 40 min to obtain a suspension. The solid was separated from mother liquor by centrifugation, then the resulting solid was resuspended the in 0.6 mL of EtOAc and stirred in room temperature for 2 days. The solid was isolated by centrifugation, to obtain Compound 1 of desired Form D.

The X-ray powder diffraction (XRPD) pattern was used to characterize the Compound 1 obtained, which showed that the Compound 1 was in Crystalline Form D of Compound 1 (Compound 1 Form D).

Example 2C: Preparation of Compound 1 Form D

Single crystal X-ray diffraction data of Compound 1 was collected at 180 K on a Rigaku XtaLAB PRO 007HF(Mo) diffractometer, with Mo Kα radiation (λ=0.71073 Å). Data reduction and empirical absorption correction were performed using the CrysAlisPro program. The structure was solved by a dual-space algorithm using SHELXT program. All non-hydrogen atoms could be located directly from the difference Fourier maps. Framework hydrogen atoms were placed geometrically and constrained using the riding model to the parent atoms. Final structure refinement was done using the SHELXL program by minimizing the sum of squared deviations of F2 using a full-matrix technique.
Preparation of Compound 1 Form D (a Single Crystal)

Compound 1 Form D was dissolved in a mixture of acetone/ACN (½) with the concentration of Compound 1 at ~7 mg/mL. A block single crystal was obtained, which was a single crystal.

The XRPD pattern was used to characterize the single crystal of Compound 1 Form D obtained, see FIG. 2A. The crystal structural data are summarized in Table 1B. The refined single crystal structure were shown in FIG. 2B. The single crystal structure of Compound 1 Form D is in the P-1 space group and the triclinic crystal system. The terminal long alkyl chain is found to have large ellipsoids, indicating high mobility with disordered atoms.

The theoretical XRPD calculated from the single crystal structure and experimental XRPD are essentially similar (FIG. 2A). A few small peaks are absent or shift because of orientation preference, disorder and tested temperature (180 K for single crystal data and 293 K for experimental one).

TABLE 1B

Crystal Data and Structure Refinement
for Compound 1 Form D (a Single Crystal)

| Empirical formula | $C_{33}H_{29}F_2N_5O_4S$ |
|---|---|
| Formula weight | 629.67 |
| Temperature/K | 179.99(10) |
| Crystal system | triclinic |
| Space group | P-1 |
| a/Å | 9.4563(5) |
| b/Å | 12.3432(5) |
| c/Å | 14.4775(6) |
| α/° | 67.575(4) |
| β/° | 83.080(4) |
| γ/° | 80.099(4) |
| Volume/Å$^3$ | 1535.98(13) |
| Z | 2 |
| $\rho_{calc}$/cm$^3$ | 1.361 |
| μ/mm$^{-1}$ | 0.164 |
| F(000) | 656.0 |
| Crystal size/mm$^3$ | 0.22 × 0.16 × 0.12 |
| Radiation | Mo Ka (λ = 0.71073) |
| 2θ range for data collection/° | 5.184 to 54.958 |
| Index ranges | −11 ≤ h ≤ 12, −15 ≤ k ≤ 16, −18 ≤ l ≤ 18 |
| Reflections collected | 19644 |
| Independent reflections | 7025 [$R_{int}$ = 0.0232, $R_{sigma}$ = 0.0321] |
| Data/restraints/parameters | 7025/312/442 |
| Goodness-of-fit on F$^2$ | 1.036 |

TABLE 1B-continued

Crystal Data and Structure Refinement
for Compound 1 Form D (a Single Crystal)

| Final R indexes [I >= 2σ (I)] | $R_1$ = 0.0587, $wR_2$ = 0.1494 |
|---|---|
| Final R indexes [all data] | $R_1$ = 0.0780, $wR_2$ = 0.1599 |
| Largest diff. peak/hole/e Å$^{-3}$ | 0.96/−0.45 |

Example 3

Solid Screen of N-(3-fluoro-4-((2-(5-(((2-methoxyethyl)amino)methyl)pyridin-2-yl)thieno[3,2-b]pyridin-7-yl)oxy)phenyl)-N-(4-fluorophenyl)cyclopropane-1,1-dicarboxamide (Compound 1)

A solid form screen of Compound 1 was conducted. Solids, when isolated in sufficient amounts, were characterized by X-ray powder diffraction (XRPD) pattern. The XRPD patterns were compared to each. Furthermore, other spectrum or methods, such as differential scanning calorimetry (DSC), thermogravimetry (TGA), and dynamic vapor sorption (DVS), were used to characterize or investigate the solids obtained.
X-Ray Powder Diffraction (XRPD)

Pattern Match versions 2.3.6 and 3.0.4 were used to create the XRPD pattern overlays. Figures labeled "Image by PatternMatch v3.0.4" were generated using an unvalidated version of the software and are therefore considered non-cGMP representations.
1) Transmission Mode XRPD XRPD patterns were collected with a PANalytical X'Pert PRO MPD diffractometer using an incident beam of Cu radiation produced using an Optix long, fine-focus source. An elliptically graded multilayer mirror was used to focus Cu Kα X-ray radiation through the specimen and onto the detector. Prior to the analysis, a silicon specimen (NIST SRM 640d) was analyzed to verify the observed position of the Si (111) peak is consistent with the NIST-certified position. A specimen of the sample was sandwiched between 3-µm-thick films and analyzed in transmission geometry. A beam-stop, short antiscatter extension, and antiscatter knife edge, were used to minimize the background generated by air. Soller slits for the incident and diffracted beams were used to minimize broadening from axial divergence. Diffraction patterns were collected using a scanning position-sensitive detector (X'Celerator) located 240 mm from the specimen and Data Collector software v. 2.2b.
2) Reflection Mode ARPD VT-XRPD patterns were collected with a PANalytical X'Pert PRO MPD diffractometer using an incident beam of Cu Kα radiation produced using a long, fine-focus source and a nickel filter. The diffractometer was configured using the symmetric Bragg-Brentano geometry. Data were collected and analyzed using Data Collector software v. 2.2b. Prior to the analysis, a silicon specimen (NIST SRM 640d) was analyzed to verify the observed position of the Si (111) peak is consistent with the NIST-certified position. A specimen of the sample was packing in a nickel-coated copper well. Antiscatter slits (SS) were used to minimize the background generated by air. Soller slits for the incident and diffracted beams were used to minimize broadening from axial divergence. Diffraction patterns were collected using a scanning position-sensitive detector (X'Celerator) located 240 mm from the sample and Data Collector software v. 2.2b.

3) Variable Temperature ARPD

An Anton Paar temperature-humidity chamber (THC) was used to collect in-situ reflection-mode XRPD patterns as a function of temperature. The temperature of the specimen was changed with a Peltier thermoelectric device located directly under the specimen holder and monitored with a platinum-100 resistance sensor located in the specimen holder. The thermoelectric device was powered and controlled by an Anton Paar TCU 50 interfaced with Data Collector.

Polarized Light Microscopy (PLM)

Samples were observed using a Leica MZ12.5 stereomicroscope with a first order red compensator. Various objectives typically ranging from 0.8-10× were used with crossed-polarized light to view the samples. Selected samples were observed in mineral oil. Selected samples were analyzed using a Leica DM LP microscope equipped with a SPOT Insight☐ color digital camera. Each sample was placed on a glass slide, a cover glass was placed over the sample, and a drop of mineral oil was added to cover the sample by capillarity. Each sample was observed using a 20×0.40NA and 40×0.74NA magnification with crossed polarizers and a first order red compensator. Images were captured using SPOT software (v. 4.5.9). A micron bar was inserted onto each image as a reference for particle size.

Differential Scanning Calorimetry (DSC)

DSC analyses were performed using a TA Instruments 2920 and Q2000 differential scanning calorimeters Temperature calibration was performed using NIST-traceable indium metal. The sample was placed into an aluminum DSC pan, covered with a lid, and the weight was accurately recorded. A weighed aluminum pan, T0C or T0CHSMP, (Tzero crimped or Tzero hermetically sealed with manual pin hole pans, respectively) configured as the sample pan was placed on the reference side of the cell. The method code on the thermogram is an abbreviation for the start and end temperature as well as the heating rate; e.g., –30-250-10 means "from –30° C. to 250° C., at 10° C./min."

Thermogravimetry (TGA)

TG analyses were performed using a TA Instruments 2950 thermogravimetric analyzer. Temperature calibration was performed using nickel and Alumel™. Each sample was placed in an aluminum pan and inserted into the TG furnace. The furnace was heated under a nitrogen purge. The method code on the thermogram is an abbreviation for the start and end temperature as well as the heating rate; e.g., 25-350-10 means "from 25° C. to 350° C., at 10° C./min".

Dynamic Vapor Sorption (DVS)

Automated vapor sorption (VS) data were collected on a VTI SGA-100 Vapor Sorption Analyzer. NaCl and PVP were used as calibration standards. Samples were not dried prior to analysis. Sorption and desorption data were collected over a range from 5% to 95% RH at 10% RH increments under a nitrogen purge. The equilibrium criterion used for analysis was less than 0.0100% weight change in 5 minutes with a maximum equilibration time of 3 hours. Data were not corrected for the initial moisture content of the samples.

Indexing

Computational studies, i.e. indexing and structure refinement are performed under the "Procedures for SSCI Non-cGMP Activities." Agreement between allowed peak positions and observed peaks indicates a consistent unit cell determination. Indexing was performed using X'Pert High Score Plus 2.2a (2.2.1) and proprietary SSCI software. No attempts at molecular packing were performed to confirm tentative indexing solutions within the scope of this work.

Example 3A: Preparation of Material A, Material B (containing Material O), Material O of Compound 1

Figure 3G:
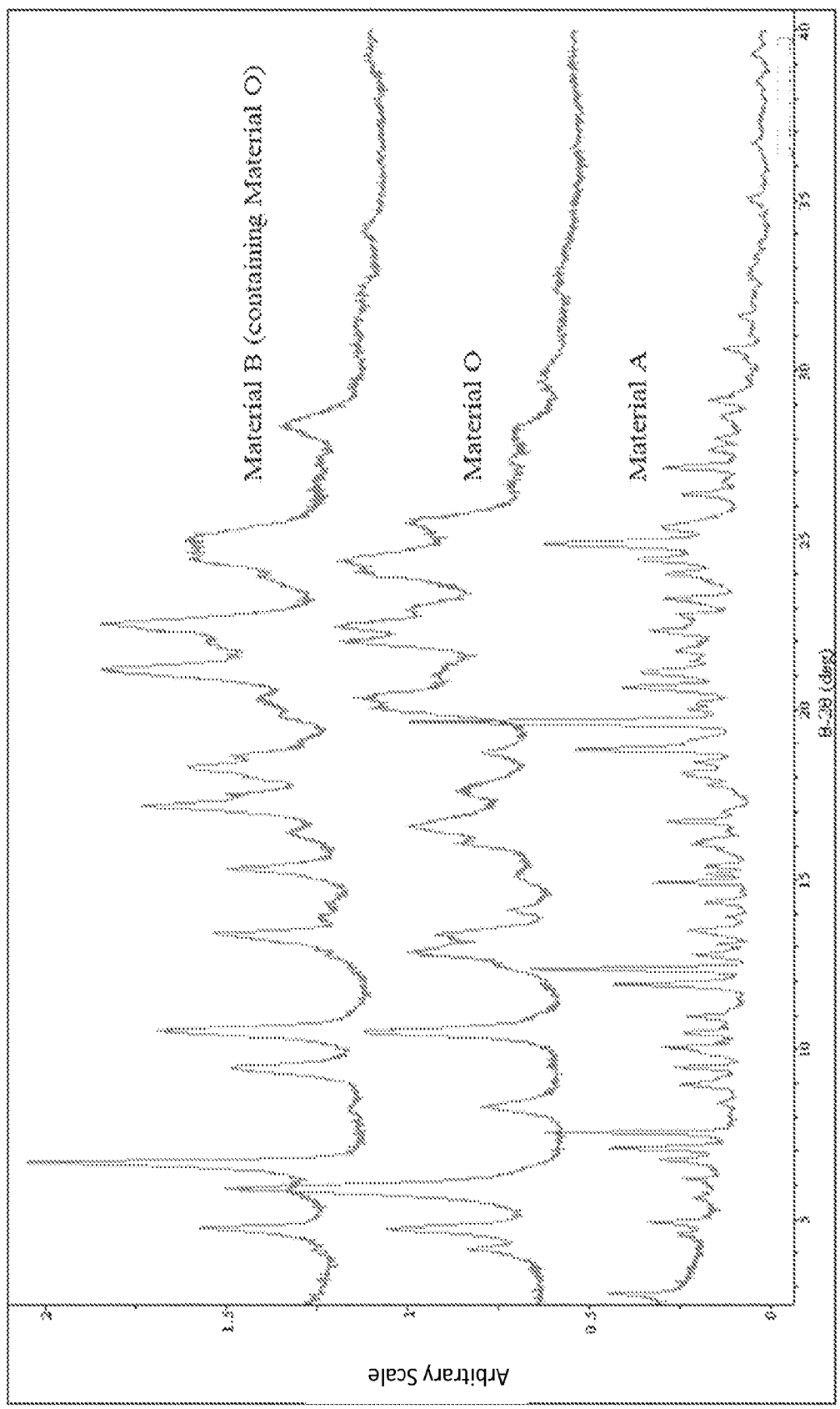
FIG. 3G illustrates an X-ray powder diffraction (XRPD) patterns of Crystalline Materials B (containing Material O), O and A of Compound 1 in Example 3.

The XRPD patterns of Materials A, B (containing Material O and Material O of Compound 1 observed are given in FIG. 3G.

Example 3B: Stable Form Screen of Compound 1

Material B (containing Material O) of Compound 1 obtained in Example 3A was triturated in various solvents including solvent systems with high water activity to target potential hydrates. The experiments were mostly conducted at ambient temperature. Selected experiments were carried out at ~40° C. to achieve sufficient solubility. In an attempt to change the impurity profile of Compound 1, the majority of slurries were filtered after approximately 24 hours and the solvents were replaced with fresh solvents (ratios were adjusted if needed). The resulting slurries were triturated for up to ~2.5 weeks. Conditions and results of the stable form screen are summarized in Table 2A.

TABLE 2A

Stable Form Screen of Compound 1

| Solvent, conditions (a) (v/v) | Observations | XRPD Results |
| --- | --- | --- |
| Acetone, RT (b) | Unknown morphology, agglomerates, some Birefringence with extinction | Form D |
| ACN, RT | Unknown morphology, agglomerates, no Birefringence with extinction | Form D |
| CHCl3/MTBE (50/50), RT | Unknown morphology, agglomerates, some Birefringence with extinction | Form D |
| Dioxane, RT | Unknown morphology, agglomerates, no Birefringence with extinction | Form C |
| DMF/ACN (30/70), RT (b) | Unknown morphology, agglomerates, some Birefringence with extinction | Form D |
| EtOAc, RT (b) | Unknown morphology, agglomerates, no Birefringence with extinction | Form C |
| EtOH, RT | Unknown morphology, agglomerates, no Birefringence with extinction | Form D |
| IPA, ~40° C.(c) | Unknown morphology, agglomerates, some Birefringence with extinction | Form D |
| MEK/heptane (80/20), RT (b) | Unknown morphology, agglomerates, some Birefringence with extinction | Form C |
| MeOH/CHCl3 (90/10), RT (b) | Unknown morphology, agglomerates, some Birefringence with extinction | Form H |
| MeOH/THF (80/20), RT (b) | Unknown morphology, agglomerates, no Birefringence with extinction | Form H |
| Nitromethane, RT | Unknown morphology, agglomerates, no Birefringence with extinction | Form D |
| Toluene/THF (60/40), RT (b) | Unknown morphology, agglomerates, some Birefringence with extinction | Form C |
| Acetone/water (80/20), RT (b) | Unknown morphology, agglomerates, some Birefringence with extinction | Materials F + G |
| Dioxane/water (80/20), RT | Dissolution, clear | — |
| DMF/water (70/30), RT (b) | Unknown morphology, agglomerates, some Birefringence with extinction | Material G, likely contains F |

TABLE 2A-continued

Stable Form Screen of Compound 1

| Solvent, conditions (a) (v/v) | Observations | XRPD Results |
|---|---|---|
| THF/water (40/60), RT (b) | Unknown morphology, agglomerates, no Birefringence with extinction | Materials F + G |
| Water, ~40° C. | Unknown morphology, agglomerates, no Birefringence with extinction | Materials F + J |

(a) Trituration was performed for ~2.5 week with solvent replacement, unless otherwise indicated.
(b) Dissolution was observed at solvent addition, which followed by precipitation.
(c) Trituration was conducted for ~2 weeks, without solvent replacement.
(d) Solubility was determined gravimetrically using mother liquor solutions.
(e) Samples appeared as film, oil orglass.

Example 3C: Polymorph Screen of Compound 1 (Solution Methods)

Material B (containing Material O) obtained in Example 3A of Compound 1 was subjected to various solution crystallization techniques such as evaporations, vapor diffusion, cooling to ambient or subambient temperature, slurries, as well as solvent/antisolvent precipitation aiming at the formation of metastable forms. Both, non-aqueous solvents and solvent systems with high water activity were employed. Conditions and results of the polymorph screen (solution experiments) are summarized in Table 2B.

TABLE 2B

Polymorph Screen of Compound 1 (Solution Methods)

| Solvent system (v/v) | Conditions (a) | Observation | XRPD Results |
|---|---|---|---|
| Acetone | Slow evaporation | Unknown morphology, some Birefringence with extinction | Material K, similar to Material |
| Acetone/ MTBE | Vapor diffusion attempt | No solids | — |
| ACN | Slow cooling from 55° C. to RT then −25° C. to −10° C.. | Small needles, agglomerates, Birefringence with extinction | Material L, disordered |
| CHCl₃ | Slow evaporation | Film | — |
| CHCl₃/IPA | Solvent/antisolvent precipitation attempt (no solids). Cooling to −25° C. to −10° C.. | Clear | — |
| | Solvent/antisolvent precipitation attempt (no solids). Cooling to −25° C. to −10° C.. Fast evaporation. | Film | — |
| Dioxane | Fast cooling from 55° C. to RT | Clear | Forms C + D |
| Dioxane/ heptane (63/37) | Added heptane, cooling to 2-8° C.. | Clear | |
| Dioxane/ heptane (38/62) | Added heptane (oiled out then precipitation). Slurring at RT for 4 days. | Unknown morphology, opaque aggregates, some Birefringence with extinction | |
| EtOAc | Slow cooling attempt from 70° C. to RT then −25° C. to −10° C. | Clear, no solids | — |
| EtOH | Slow cooling from 55° C. to RT then −25° C. to −10° C.. | Very small, possibly needles, agglomerates, Birefringence with extinction | Material J |

TABLE 2B-continued

Polymorph Screen of Compound 1 (Solution Methods)

| Solvent system (v/v) | Conditions (a) | Observation | XRPD Results |
|---|---|---|---|
| IPA | Slow cooling from 70° C. to RT then −25° C. to −10° C.. | Rosette-like, some Birefringence with extinction | Materials E + G, disordered |
| MEK | Slow cooling from 55° C. to RT then −25° C. to −10° C.. | Clear | — |
| MEK/ heptane (33/67) | The clear solution of Material B (containing Material O) dissolved in MEK. Added heptane (oiled out the precipitation). Slurring at RT for 4 days. | Unknown morphology, opaque aggregates, some BE | Form D |
| MeOH/ CHCl₃ (50/50) | Fast evaporation | Unknown morphology, possibly needle-like, agglomerates, Birefringence with extinction | Material J |
| Nitromethane | Slow cooling from 70° C. to RT, then −25° C. to −10° C.. | Rosettes, Birefringence with extinction | Form D (shifted) |
| THF/ MTBE | Vapor diffusion attempt (oiled out). Added MTBE. Stirring at RT for 4 days. | Unknown morphology, opaque aggregates, some Birefringence with extinction | Form C |
| Acetone/ water | Solvent/antisolvent precipitation | Unknown morphology, agglomerates, some Birefringence with extinction | Material F |
| ACN/water (57/43) | Slow cooling from 70° C. to RT (oil initially formed dissolved) then 2-8° C.. | Small needles, agglomerates, Birefringence with extinction | Material F |
| ACN/water (33/67) | Slow cooling from 70° C. to RT (oiled out). Sonicated fro 20 min. Slurring at RT for 2 weeks. | Unknown morphology, agglomerates, no Birefringence with extinction | Materials F + G |
| Dioxane/ water (20/80) | Slow cooling from 70° C. to RT then 2-8° C. (some oiling out). | Insufficient solids | — |

(a) Solvent ratios, temperature and duration of experiments are approximate.

Material J was produced under selected, both aqueous and non-aqueous conditions. Material J is crystalline. Short term vacuum drying at ~40° C. resulted in the presence of another material (designated Material M).

Example 3C: Drying Experiments of Compound 1 Crystalline Forms

Limited non-solvent based experiments were conducted with materials generated during the stable form screen and included short term vacuum drying at elevated temperature. Conditions and results of the drying experiments are summarized in are shown in Table 2C.

TABLE 2C

Non-Solvent Based Experiments

| Starting Material | Conditions | XRPD Results |
|---|---|---|
| Form C | Vacuum oven drying, ~40° C., 2.5 | Form C |
| Form D | Vacuum oven drying, ~40° C., 2.5 | Form D |

TABLE 2C-continued

Non-Solvent Based Experiments

| Starting Material | Conditions | XRPD Results |
|---|---|---|
| Form H | Vacuum oven drying, ~40° C., 2.5 | Form H |
| Material J | Vacuum oven drying, ~40° C., 2.5 | Materials J + M |

Example 3D: X-Ray Powder Diffraction (XRPD) Pattern of Solid Forms of Compound 1

Several materials obtained in Example 3A through 3E, with unique XRPD patterns were produced. The unique materials were designated as Forms C, D, H, and Materials A, B, E, F, G, J, K, L, N and O. The XRPD patterns of the forms are presented in FIG. 3A. The patterns of other materials observed are given in FIG. 3B.

Further successful indexing of the XRPD pattern for Form C (from dioxane), Form D and Form H indicates that Forms C, D and H are composed of a single crystalline phase. See, FIG. 3B, FIG. 3C and FIG. 3D, separately. And, the TGA and DSC Thermograms for Form D produced in acetone was shown in FIG. 3F.

The XRPD patterns of Materials A Through L could not be indexed, indicates that Materials A Through L are crystalline materials with some degree of disorder, or mixtures. See, FIG. 3E. Wherein, Material E was observed in a single experiment conducted in isopropyl alcohol, and the sample was produced by cooling and possibly contained another material designated Material G; Material F was produced at moderate and high water activity often as a mixture with another material designated as Material G; Material G, observed as a mixture with Material F, was only produced in solvent systems with higher water activities; Material K has a similar XRPD pattern to that of Material G.

Example 2E: Slurry Interconversion Experiments

To investigate the relationship between selected materials produced during screening, limited slurry interconversion experiments were conducted. The experiments were performed by slurring seeds of solids of interest at ambient temperature in two different solvent systems. All materials were vacuum dried prior to the slurry (~40° C., ~2.5 hours). Solvent conditions were selected to achieve sufficient solubility of materials tested. Both, non-aqueous conditions and a solvent system with high water activity were utilized. Results are summarized in Table 2D.

A slurry of Forms C, D, and H was conducted in ethyl acetate, and the results were inconclusive. The experiment led to a mixture of Forms C and D showing that Form H is the least thermodynamically stable under these conditions, but the relative stability of C and D remains unclear. The comparison of the XRPD peak intensities for the mixture suggests possible excess of Form C. However, this could be caused by Form H going selectively to Form C. Therefore, the relative stability of Forms C and D is not known. The slurry of seeds of Materials F, G, and J in tetrahydrofuran/water (40/60) resulted in Material F.

TABLE 2D

Slurry Interconversion Experiments

| Starting Material (a) | Solvent System (b) | XRPD Results |
|---|---|---|
| Form C + Form D + Form H Materials F/G mixture Materials J/M mixture | EtOAc THF/water (40/60) | Forms C + D Material F |

(a) Slurries were performed for ~42 hours with vacuum dried starting material (~40° C., ~2.5 hours).
(b) Solids were agitated in solvents saturated by slurry for ~3 hours, with solvent replacement for ethyl acetate solution.

Example 2H: Preliminary Physical Stability Assessment of Form D

Preliminary physical stability assessment of Form D was performed. The data are summarized in Table 2E.

The experiments indicated Form D remained unchanged when subjected to ~43% and ~75% RH stresses and a short term vacuum drying at ~40° C. The XRPD patterns of the stressed materials show no significant peak shifts compared to the untreated samples. The XRPD pattern of Form D obtained from high water activity slurry is consistent with the pattern of the untreated material. However, small shifts of selected peaks were observed, possibly due to hydration.

TABLE 2E

Preliminary Stability Assessment for Form D

| Conditions (a) | XRPD Results |
|---|---|
| ~43% RH/RT | Consistent with Form D, no significant shifts of peaks |
| ~75% RH/RT | Consistent with Form D, no significant shifts of peaks |
| Acetone/water (40/60), slurry, RT | Consistent with Form D, slight peak shifts |
| EtOH/water (40/60), slurry, RT | Consistent with Form D, slight peak shifts |
| Water, slurry, RT | Consistent with Form D, slight peak shifts |

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

We claim:

1. A crystalline form of N-(3-fluoro-4-((2-(5-(((2-methoxyethyl) amino) methyl) pyridin-2-yl)thieno[3,2-b] pyridin-7-yl) oxy) phenyl)-N-(4-fluorophenyl) cyclopropane-1,1-dicarboxamide.

2. The crystalline form according to claim 1, wherein the crystalline form is designated as Form D, wherein Form D has an X-ray powder diffraction pattern (XRPD) comprising diffraction peaks having ° 2θ angle values independently selected from the group consisting of 7.8±0.2°, 14.3±0.2° and 17.2±0.2°.

3. The crystalline form according to claim 2, wherein Form D has an X-ray powder diffraction pattern (XRPD) comprising diffraction peaks having °2θ angle values independently selected from the group consisting of 7.8±0.2°, 14.3±0.2°, 17.2±0.2° and 21.7±0.2°.

4. The crystalline form according to claim 2, wherein Form D has an X-ray powder diffraction pattern (XRPD) comprising diffraction peaks having °2θangle values independently selected from the group consisting of 7.8±0.2°, 14.3±0.2°, 17.2±0.2°, 21.7±0.2° and 26.4±0.2°.

5. The crystalline form according to claim 2, wherein Form D has an X-ray powder diffraction pattern (XRPD) comprising diffraction peaks having °2θangle values independently selected from the group consisting of 7.8±0.2°, 14.3±0.2°, 16.6±0.2°, 17.2±0.2°, 19.3±0.2°, 21.7±0.2° and 26.4±0.2°.

6. The crystalline form according to claim 2, wherein Form D has an X-ray powder diffraction pattern (XRPD) comprising diffraction peaks having °2θangle values independently selected from the group consisting of 7.8±0.2°, 14.3±0.2°, 16.6±0.2°, 17.2±0.2°, 19.3±0.2°, 21.7±0.2°, 23.3±0.2°, 26.4±0.2° and 28.2±0.2°.

7. The crystalline form according to claim 2, wherein Form D has an X-ray powder diffraction pattern (XRPD) comprising diffraction peaks having °2θangle values independently selected from the group consisting of 6.50±0.2°, 7.8±0.2°, 14.3±0.2°, 16.6±0.2°, 17.2±0.2°, 19.3±0.2°, 21.7±0.2°, 23.3±0.2°, 25.7±0.2°, 26.4±0.2° and 28.2±0.2°.

8. The crystalline form according to claim 2, wherein Form D has an XRPD pattern substantially as shown in FIG. 1A.

9. The crystalline form according to claim 2, wherein Form D is characterized by having an endotherm with a peak maximum at approximately 180° C. (onset ~178° C.) by differential scanning calorimetry (DSC).

10. The crystalline form according to claim 2, wherein Form D has a DSC thermogram substantially as shown in FIG. 1B.

11. The crystalline form according to claim 2, wherein Form D has an XRPD pattern substantially as shown in FIG. 2A(1) or FIG. 3C.

12. A pharmaceutical composition, comprising a crystalline form of N-(3-fluoro-4-((2-(5-(((2-methoxyethyl) amino) methyl) pyridin-2-yl)thieno[3,2-b]pyridin-7-yl) oxy) phenyl)-N-(4-fluorophenyl) cyclopropane-1,1-dicarboxamide.

13. The pharmaceutical composition according to claim 12, wherein the crystalline form is in Form D, wherein Form D has an X-ray powder diffraction pattern (XRPD) comprising diffraction peaks having °2θangle values independently selected from the group consisting of 7.8±0.2°, 14.3±0.2° and 17.2±0.2°.

14. A pharmaceutical composition, comprising a crystalline form according to claim 2.

15. The pharmaceutical composition according to claim 12, further comprising at least one pharmaceutically acceptable excipient and/or diluent.

16. A method for inhibiting multi-tyrosine kinase activity in a cell, comprising contacting the cell in which inhibition of multi-tyrosine kinase activity is desired with a therapeutically effective amount of a crystalline form according to claim 1.

17. A method for treating cancer in a subject in need thereof comprising administering to the subject with a therapeutically effective amount of a crystalline form of N-(3-fluoro-4-((2-(5-(((2-methoxyethyl) amino) methyl) pyridin-2-yl)thieno[3,2-b]pyridin-7-yl) oxy) phenyl)-N-(4-fluorophenyl) cyclopropane-1,1-dicarboxamide according to claim 1.

18. The method according to claim 17, wherein the therapeutically effective amount of the crystalline form is between about 5 to 1000 mg per day.

19. The method according to claim 18, wherein the therapeutically effective amount of the crystalline form is between about 50 to 200 mg per day.

20. The method according to claim 17, wherein the cancer is non-small cell lung cancer (NSCLC).

21. The method according to claim 17, wherein the cancer is bladder cancer.

22. The method according to claim 17, wherein the cancer is kidney cancer.

23. The method according to claim 17, wherein the cancer is ovarian cancer.

24. The method according to claim 17, wherein the cancer is gastric cancer.

25. The method according to claim 17, wherein the cancer is liver cancer.

26. The method according to claim 17, wherein the cancer is glioma.

27. The method according to claim 17, wherein the cancer is breast cancer.

28. The method according to claim 17, wherein the cancer is sarcoma.

29. The method according to claim 28, wherein the sarcoma is leiomyosarcoma.

30. The method according to claim 17, wherein the cancer is a multi-tyrosine kinase-associated cancer.

31. A process for the preparation of crystalline Form D of N-(3-fluoro-4-((2-(5-(((2-methoxyethyl) amino) methyl) pyridin-2-yl)thieno[3,2-b]pyridin-7-yl) oxy) phenyl)-N-(4-fluorophenyl) cyclopropane-1,1-dicarboxamide, comprising any one of the following procedures:

1) Dissolving N-(3-fluoro-4-((2-(5-(((2-methoxyethyl) amino) methyl) pyridin-2-yl)thieno[3,2-b]pyridin-7-yl) oxy) phenyl)-N-(4-fluorophenyl) cyclopropane-1,1-dicarboxamide in acetone, heating to reflux, cooling with stiring, to obtain Form D;

2) Dissolving N-(3-fluoro-4-((2-(5-(((2-methoxyethyl) amino) methyl) pyridin-2-yl)thieno[3,2-b]pyridin-7-yl) oxy) phenyl)-N-(4-fluorophenyl) cyclopropane-1,1-dicarboxamide, Form D as crystal seed in acetone, heating to reflux, cooling with stiring, to obtain Form D;

3) triturating N-(3-fluoro-4-((2-(5-(((2-methoxyethyl) amino) methyl) pyridin-2-yl)thieno[3,2-b]pyridin-7-yl) oxy) phenyl)-N-(4-fluorophenyl) cyclopropane-1,1-dicarboxamide in an organic solvent at ambient temperature, filtering the slurries, replacing the organic solvent with fresh organic solvent, to obtain Form D, wherein the organic solvent is selected from acetone, ACN, CHCl3, MTBE, DMF, EtOH, Nitromethane, or a mixture thereof;

4) dissolving N-(3-fluoro-4-((2-(5-(((2-methoxyethyl) amino) methyl)pyridin-2-yl)thieno[3,2-b]pyridin-7-yl) oxy)phenyl)-N-(4-fluorophenyl)cyclopropane-1,1-dicarboxamide in THF, evaporating, dissolving in EtOAc, precipitating, to obtain Form D; and, 5) Triturating N-(3-fluoro-4-((2-(5-(((2-methoxyethyl) amino)methyl)pyridin-2-yl)thieno[3,2-b]pyridin-7-yl) oxy)phenyl)-N-(4-fluorophenyl)cyclopropane-1,1-dicarboxamide in IPA at ~40° C., filtering the slurries, replacing the IPA with fresh IPA, to obtain Form D.

* * * * *